United States Patent
Bono et al.

(10) Patent No.: US 10,498,821 B1
(45) Date of Patent: Dec. 3, 2019

(54) MANAGING NAS SERVER CLONING IN NETWORK ATTACHED STORAGE (NAS) CLUSTER

(71) Applicant: EMC IP Holding Company LLC, Hopkinton, MA (US)

(72) Inventors: Jean-Pierre Bono, Westborough, MA (US); Frederic Corniquet, Le Pecq (FR); Himabindu Tummala, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 208 days.

(21) Appl. No.: 15/664,345

(22) Filed: Jul. 31, 2017

(51) Int. Cl.
```
G06F 11/00      (2006.01)
H04L 29/08      (2006.01)
G06F 11/26      (2006.01)
G06F 16/182     (2019.01)
G06F 11/20      (2006.01)
G06F 11/14      (2006.01)
G06F 11/16      (2006.01)
```

(52) U.S. Cl.
CPC ...... H04L 67/1097 (2013.01); G06F 11/1458 (2013.01); G06F 11/1666 (2013.01); G06F 11/2053 (2013.01); G06F 11/2082 (2013.01); G06F 11/26 (2013.01); G06F 16/1827 (2019.01); H04L 67/1095 (2013.01)

(58) Field of Classification Search
CPC .............. G06F 11/1458; G06F 11/1666; G06F 11/2053; G06F 11/2082; G06F 11/2017; G06F 11/2043; G06F 11/2046
See application file for complete search history.

(56) References Cited

U.S. PATENT DOCUMENTS

| | | | | |
|---|---|---|---|---|
| 7,284,104 B1 * | 10/2007 | Wu | ...................... | G06F 11/1451 707/999.202 |
| 7,657,796 B1 * | 2/2010 | Kaiser | .................. | G06F 11/1435 707/821 |
| 7,827,366 B1 * | 11/2010 | Nadathur | ............ | G06F 11/1451 711/161 |
| 8,117,161 B2 | 2/2012 | Anzai et al. | | |
| 8,117,493 B1 * | 2/2012 | Fultz | .................... | G06F 11/2028 714/6.23 |
| 8,266,099 B2 | 9/2012 | Vaghani | | |
| 8,311,991 B2 | 11/2012 | Aggarwal et al. | | |
| 8,938,643 B1 | 1/2015 | Karmarkar et al. | | |
| 9,009,525 B1 * | 4/2015 | Murphy | .................... | H04L 9/16 713/193 |

(Continued)

*Primary Examiner* — Charles Ehne
(74) *Attorney, Agent, or Firm* — BainwoodHuang

(57) ABSTRACT

A technique for managing data storage provides multiple physical computing machines and block storage arranged in a NAS (network attached storage) cluster. The physical computing machines run NAS servers, with each NAS server including an FSDB (file system database) that identifies a set of file systems that belong to the NAS server. LUNs (Logical UNits) in the block storage provide backing store for the set of file systems of each NAS server. The NAS cluster performs a NAS server cloning operation in which an existing source NAS server is cloned in its entirety to create a separate clone NAS server, the operation automatically cloning all the separate file systems of the source NAS server and related metadata without a need for user involvement on a per-filesystem basis.

18 Claims, 18 Drawing Sheets

(56) References Cited

U.S. PATENT DOCUMENTS

2006/0253731 A1* 11/2006 Petruzzo ............. G06F 11/1456
714/6.2
2008/0244172 A1* 10/2008 Kano .................. G06F 11/2069
711/112

* cited by examiner

File System Database 152 (Per NAS Server 150)

For Each User File System in this NAS Server 150
- File System Name
- Export FSID
- Internal FSID
- File System State (e.g., Mounted, Unmounted)
- Dev-ID of File System
- Mount Point Name and Options for File System
- Max Provisioned Capacity of File System
- Nature of File File System (e.g., Production, Snapshot, Migration)

*FIG. 7*

Management Database 162 (On Cluster Manager 160)

For Each Tenant
- Tenant Name
- Tenant UUID
- ID of each NAS Node Exclusively Owned
- ID of each NAS Node Shared For Each NAS Server 150
- Tenant UUID
- NAS Node ID
- NAS Server Name
- NAS Server UUID
- State (e.g., Normal, Destination, or Offline)
- Unique Dev-ID and LUN for Root FS
- Unique Dev-ID and LUN for Config FS
- Unique Dev-ID and LUN for each user file system (including snapshots)

*FIG. 8*

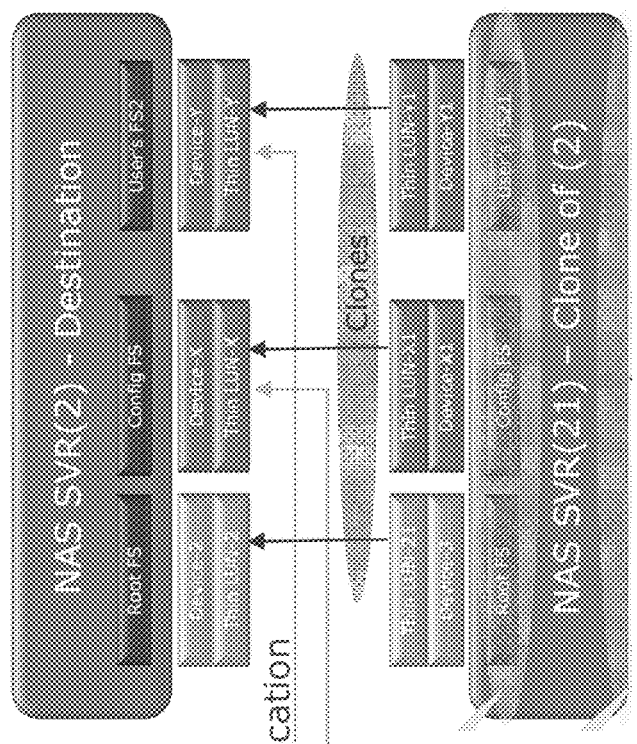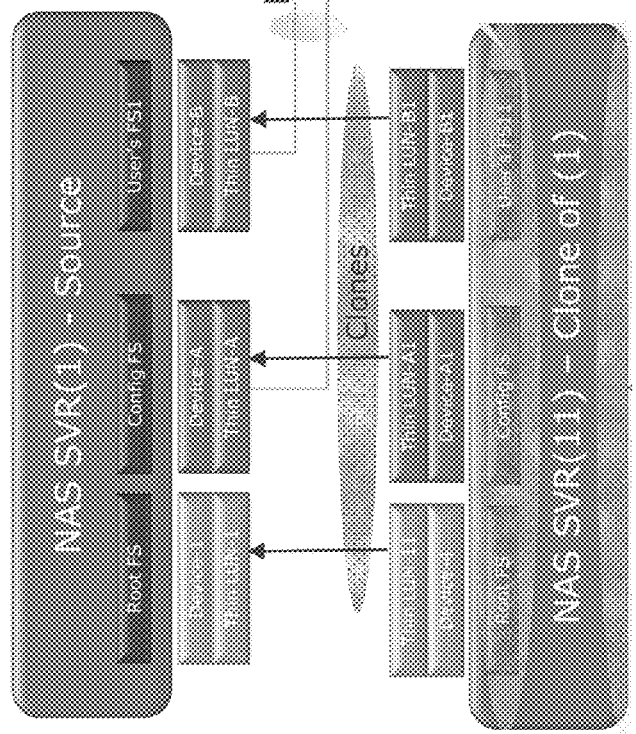
FIG. 19

MANAGING NAS SERVER CLONING IN NETWORK ATTACHED STORAGE (NAS) CLUSTER

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

SUMMARY

Disclosed herein are methods and apparatus for managing NAS server cloning in a network attached storage (NAS) cluster.

A NAS Server is an important building block of software defined NAS architecture and may be deployed for important use cases such as disaster recovery testing, file system backup, ongoing consistency check to assess the consistency of file systems making up the NAS Server, and NAS server deployment from template. While today's products address some of these use cases, they are handled through the lifecycle of primary NAS server objects which can be cumbersome. For instance, with today's solution, each of the file systems that make up a NAS Server will need to be individually snapped and exported, and individually deleted when not needed anymore. While for small systems this approach may be fine, the burden very quickly becomes overwhelming and error prone when dealing w/large systems with hundreds of NAS Servers and a large number of file systems. Using NAS server cloning as described herein, an end user doesn't need to worry about how many file systems are part of the source NAS Server, as the cloning of the storage is carried out by NAS server business logic orchestration of the NAS server cluster. Additionally, a NAS server clone is entirely independent from the source and can evolve on its own as part of the above or other use cases. At the same time, the clone may be realized as a so-called "soft" clone, meaning that there is no duplication of non-modified pieces of file systems that are shared between different clones. Thus, in some embodiments the cloning operation can be performed very fast and efficient as there is no data duplication.

More particularly, a method is disclosed of managing data storage that includes operating multiple physical computing machines in a NAS (network attached storage) cluster, the physical computing machines interconnected by a computer network and having access to block storage. A source NAS server is operated from a physical computing machine in the NAS cluster, the source NAS server including a dedicated FSDB (file system database) that identifies a set of file systems that belong to the source NAS server, the set of file systems backed by a set of LUNs (Logical UNits) hosted by the block storage. In operation, a NAS server cloning operation is performed by which a clone NAS server is created as a clone of the source NAS server. The NAS server cloning operation includes:

co-operating with the block storage to clone the set of LUNs to create a set of cloned LUNs to back file systems of the clone NAS server; and mounting and configuring the file systems of the cloned LUNs, the configuring including (1) recording new network addresses for the file systems and network-usable server name for the clone NAS server, and (2) recording new internal and external file system identifiers for a root file system of the clone NAS server.

The clone NAS server is subsequently operated in the NAS cluster independently of the source NAS server, the clone NAS serving its file systems backed by the set of cloned LUNs hosted by the block storage.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 7 shows an example FSDB (file system database) of a NAS server in additional detail.

FIG. 8 shows an example management database of a cluster manager of FIG. 1 in additional detail.

FIG. 19 is schematic diagram showing more details of the arrangement of FIG. 18.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

This document is provided in the following sections to assist the reader:

- Section I presents an example system environment and NAS (network attached storage) cluster in which embodiments of the invention can be practiced.
- Section II presents certain specific functionality that may be realized in a NAS cluster such as the one presented in Section I.

Section I: Example Environment and NAS Cluster

An improved technique for managing data storage provides multiple physical computing machines and block storage arranged in a NAS (network attached storage) cluster. The physical computing machines run NAS servers, with each NAS server including an FSDB (file system database) that identifies a set of file systems that belong to the NAS server. Providing FSDBs on a per-NAS-server basis promotes mobility of NAS servers as well as scalability of the NAS cluster overall.

This section presents a novel platform for realizing a NAS cluster, which employs any number of NAS data nodes and one or more management nodes having access to shared block storage. Each node of the cluster runs a software library to support NAS cluster operations within an operating system, such as Linux. Example implementations of the NAS cluster leverage software-defined features, such as software defined storage (SDS), and may be deployed over a wide range of operating platforms, such as ESX (VMware), KVM (kernel-base virtual machine), bare metal, or containers (e.g., Docker containers).

Figure 1:
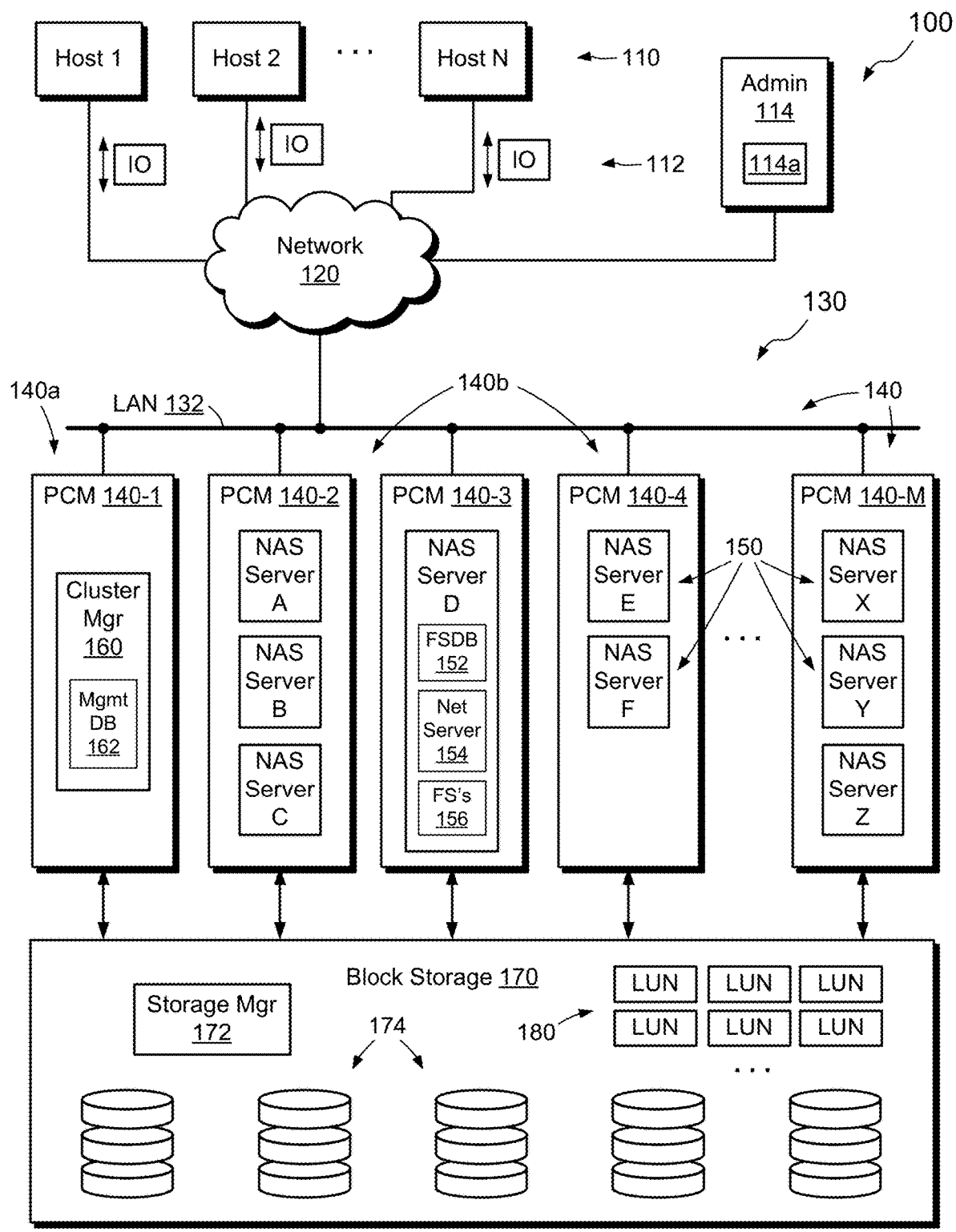
FIG. 1 is a block diagram of an example electronic environment and NAS (network attached storage) cluster in which embodiments of the improved technique hereof can be practiced.

FIG. 1 shows an example environment 100 in which embodiments of the improved technique hereof can be practiced. Here, multiple host computing devices ("hosts") 110 access a NAS cluster 130 over a network 120. The NAS cluster 130 includes multiple physical computing machines 140 (e.g., 140-1 through 140-M) connected to one another via a computer network, such as a LAN (local area network) 132. Each of the physical computing machines 140 has access to block storage 170, which includes multiple storage drives 174, such as magnetic disk drives, electronic flash drives, NVM-e drives, and/or other types of drives. The block storage 170 includes a storage manager 172, which manages block-based functions, such as provisioning, snapping, replication, and so forth, as well as communication with external equipment. In some examples, the storage manager 172 arranges the storage drives 174 in RAID (Redundant Array of Independent Disks) groups or in other redundant arrangements, and expresses the storage drives 174 as Logical Units (LUNs) 180. Each LUN 180 may be constructed from any number of storage drives 174, from portions of such storage drives 174, or from a single portion of a single storage drive 174. As is known, clients may access data in LUNs by specifying logical unit number and offset.

The environment 100 further includes an administrative machine 114, such as a computer, which runs an administrative program 114a for managing the NAS cluster 130. In some examples, the administrative program 114a and the storage manager 172 are provided together in a single program or set of programs. Thus, in some examples, the storage manager 172 manages not only the block storage 170 but also the NAS cluster 130.

The physical computing machines 140 may be provided as circuit board assemblies, or "blades," which plug into a chassis (or multiple chassis) that encloses and cools them. Each chassis has a backplane for interconnecting the physical computing machines 140, and additional connections may be made among physical computing machines using cables. It is understood that no particular hardware configuration is required, however, as the physical computing machines 140 may be any type of computing devices capable of processing host I/O requests.

The hosts 110 may be any computing device or devices that access the NAS cluster 130 for reading and/or writing data stored therein. Examples of hosts 110 include personal computers, smart phones, tablet computers, Internet of Things (IoT) devices, workstations, enterprise servers, or any other type or types of processing device capable of exchanging data over a network. The network 120 can itself be any type of computer network, such as the Internet, a WAN (wide area network), a LAN, or any other type of network or combination of networks. In some examples, the network 120 and the LAN 132 are provided as a single network.

The block storage 170 may be implemented in a variety of ways. In one example, a VMAX array, Storage Center array, XtremIO array, or some other type of block-based array provides the block storage 170 (VMAX, Storage Center, and XtremIO are available from Dell EMC). In such arrangements, each of the physical computing machines 140 may connect to the block storage 170 directly, via a SAN (storage area network), or in some other manner. In other examples, the block storage 170 may be provided using cloud-based storage, such as Amazon Web Services (e.g., EC2 or EBS), Microsoft Azure, and Google Cloud, using VSAN (virtual storage area network), or using SDS, such as ScaleIO, which turns direct-attached storage into shared block storage. Using ScaleIO, the physical computing machines 140 may include direct-attached storage, which ScaleIO virtualizes and makes available for use across the NAS cluster 130. In some examples, the NAS cluster 130 renders the block storage 170, regardless of its source, as SDS, e.g., by abstracting APIs (application programming interfaces) for platform management, provisioning, and advanced data services. Different types of storage technology may be combined in any suitable way. For example, the block storage 170 may include a combination of XtremIO storage and cloud-based storage.

As further shown in FIG. 1, the physical computing machines 140 may be configured as either cluster manager nodes 140a or as NAS data nodes 140b. In the example shown, which is not intended to be limiting, each physical computing machine 140 serves only one role, either as a cluster manager node or as a NAS data node, and there is only one cluster manager node for the entire NAS cluster 130. As shown, physical computing machine 140-1 is configured as a cluster manager node and includes a cluster manager 170. The cluster manager 160 includes a management database 162, which contains information about the NAS cluster 130 and information about the various NAS data nodes. In an example, the cluster manager 160 acts as a single entry point for control and management of the NAS cluster 130.

As further shown, physical computing machines 140-2 through 140-M are configured as NAS data nodes 140b. The NAS data nodes 140*b* host NAS servers 150. FIG. 1 shows several NAS servers 150 (A-F and X-Z), with NAS Server D shown in additional detail and intended to be representative of all NAS servers 150. Each NAS server 150 includes a file system database (FSDB) 152, a set of network servers 154 (e.g., one or more CIFS, SMB, and/or NFS servers), and a set of file systems 156 that belong to the NAS server 150. The FSDB 152 provides information about each of the set of file systems 156, and the network server(s) 154 enable network access to the set of file systems 156 by hosts 110.

The set of file systems 156 may include production file systems as well as snapshots. In a particular example, each file system is backed by a respective LUN 180 in the block storage 170, i.e., there is a one-to-one relationship between file systems and LUNs. In an example, each file system belongs to one and only one NAS server 150. These are working assumptions but should not be regarded as limiting. A NAS data node may operate any number of NAS servers 150, and each NAS server 150 may include any number of file systems.

NAS servers 150 are not generally themselves implemented as virtual machines or even virtualized userspace containers. Rather, NAS servers 150 are preferably lightweight structures, with many NAS servers 150 capable of operating within a single execution environment on a physical computing machine 140. Owing to their lightweight nature, NAS servers 150 can be quickly moved from one physical computing machine to another with little or no disruption to hosts 110.

Although the NAS cluster 130 appears to be deployed from a single location, this is merely an example. Alternatively, the NAS cluster 130 may be deployed across multiple locations.

In example operation, hosts 110 issue I/O requests 112 directed to particular file systems within the NAS cluster 130. Network servers 154 operating within NAS data nodes 140*b* receive the I/O requests 112, and the respective physical computing machines process the I/O requests 112 to effect reads and/or writes of specified data. Specified data may include particular files, directories, or portions thereof within specified file systems.

One should appreciate that the NAS data nodes 140*b* act as vehicles for moving data between hosts 110 and block storage 170 but do not persistently store the file systems themselves. Rather, block storage 170 provides persistent storage of the file systems of all of the NAS servers 150, e.g., with data of each file system stored in a respective LUN 180.

The pictured arrangement promotes mobility of NAS servers 150 among NAS data nodes 140*b*. For example, the cluster manager 160 orchestrates provisioning, failover, and load balancing of NAS servers 150 across NAS data nodes in an efficient manner that avoids bottlenecks. By providing an FSDB 152 with each NAS server 150, each NAS server 150 is realized as a highly self-contained structure, as it does not rely on access to any centralized database for most information about its contents. Movement of a NAS server 150 from a first NAS data node to a second NAS data node is predominantly a matter of disabling a network server 154 on the first NAS data node, starting a network server on the second NAS data node, accessing the FSDB 152 of the NAS server to identify the file systems that it contains, and connecting to the LUNs 180 in block storage 170 that provide backing store for those file systems. The self-contained nature of the NAS servers 150 also promotes scalability as it enables thousands of NAS servers to be managed by a single cluster manager 160.

Figure 2:
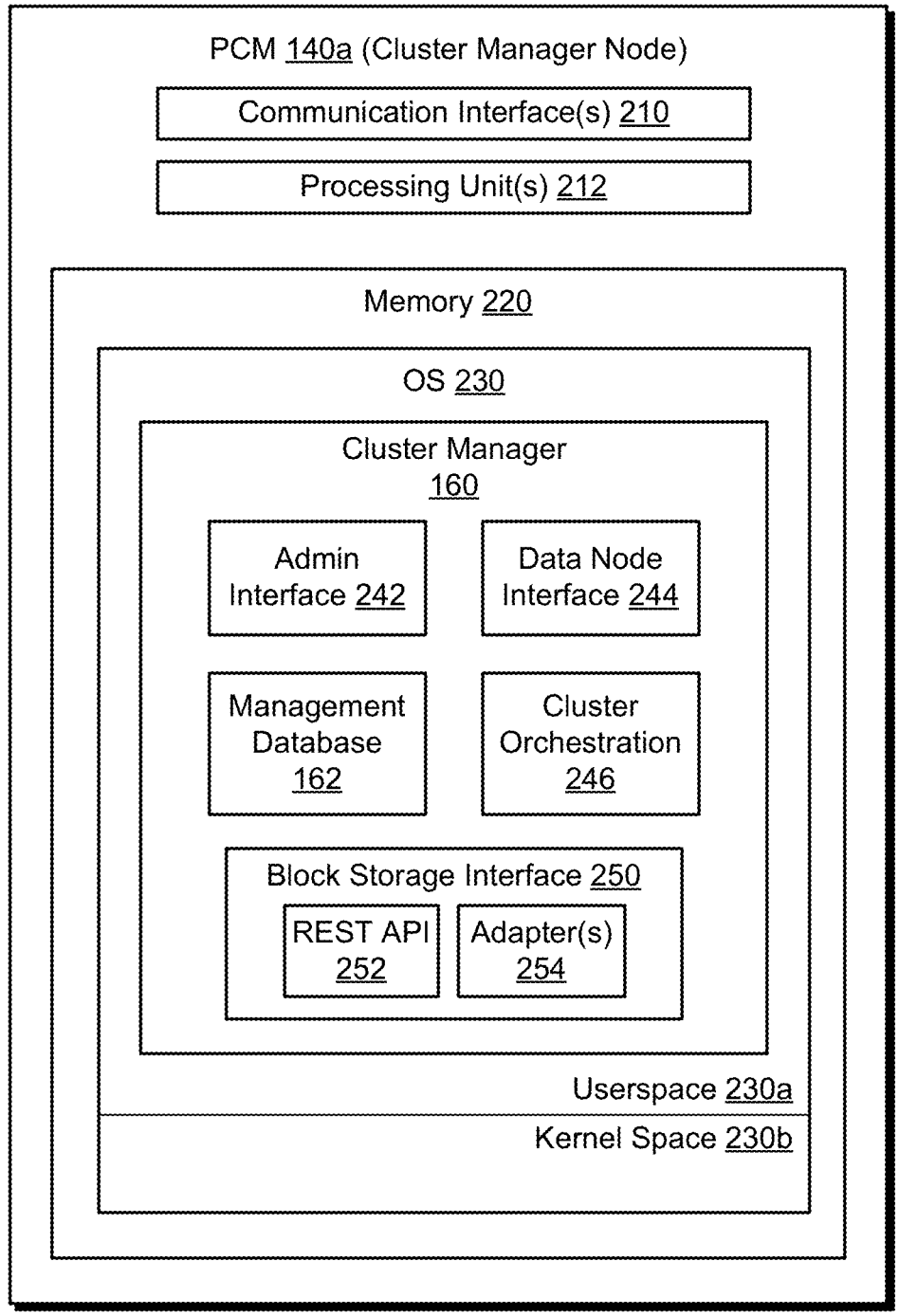
FIG. 2 is a block diagram of an example physical computing machine of the NAS cluster of FIG. 1 configured as a cluster manager.

FIG. 2 shows an example implementation of a physical computing machine configured as a NAS cluster manager node 140*a*. Physical computing machine 140*a* is intended to be representative of physical computing machine 140-1 in FIG. 1, as well as any additional cluster manager nodes. For example, some implementations may employ multiple cluster manager nodes for redundancy or locality.

Cluster manager node 140*a* includes one or more communication interfaces 210, a set of processing units 212, and memory 220. The communication interfaces 210 include, for example, network interface adapters for converting electronic and/or optical signals received over the network 120 to electronic form for use by the cluster manager node 140*a*. The set of processing units 212 includes one or more processing chips and/or assemblies. In a particular example, the set of processing units 212 includes numerous multi-core CPUs. The memory 220 includes both volatile memory (e.g., RAM), and non-volatile memory, such as one or more ROMs, disk drives, solid state drives, and the like. The set of processing units 212 and the memory 220 together form control circuitry, which is constructed and arranged to carry out various methods and functions as described herein. The memory 220 includes a variety of software constructs realized in the form of executable instructions. When the executable instructions are run by the set of processing units 212, the set of processing units 212 is caused to carry out the operations of the software constructs. Although certain software constructs are specifically shown and described, it is understood that the memory 220 typically includes many other software constructs, which are not shown, such as various applications, processes, and daemons.

As further shown in FIG. 2, the memory 220 "includes," i.e., realizes by execution of software instructions, an operating system (OS) 230, which includes userspace 230*a* and kernel space 230*b*. The cluster manager 160 (FIG. 1) runs within userspace 230*a* and includes the following software constructs:

Administrative Interface 242. An interface for communicating with administrative program 114*a*, which may be implemented stand-alone or within storage manager 172 (FIG. 1). For example, administrative program 114*a* presents a graphical user interface (GUI) that enables administrators to query the NAS cluster 130, establish settings, provision NAS servers 150, create file systems, perform load balancing, take snapshots, start replication sessions, and/or perform other administrative activities.

Data Node Interface 244. Interface to NAS data nodes 140*b* in the NAS cluster 130. May use TCP/IP (transmission control protocol/Internet protocol) or some other suitable protocol for communicating over LAN 132.

Management Database 162. The above-described database for storing information about the NAS cluster 130 and information about the various NAS data nodes.

Cluster orchestration 246. Manages procedures involving data services within and between NAS data nodes.

Block Storage Interface 250. Control interface to block storage 170. May include REST (representational state transfer) interface 252 and one or more adapters 254. REST interface 252 provides a generalized control interface that applies across different makes and/or models of block storage 170. Adapter(s) 254 are specific to particular makes and/or models, and map REST instructions to corresponding control instructions in a native control vocabulary of the block storage 170. In some examples, adapter 254 is provided in storage manager 172 rather than in cluster manager 160. For example, adapter 254 may be installed as a storage manager plug-in.

In an example, the cluster manager node 140a implements the cluster manager 160 as a user process. In a particular non-limiting example, the operating system 230 is Linux-based. Other operating systems may be used, however, such as Unix-based operating systems and Windows-based operating systems. Although the operating system 230 is shown as running directly on the cluster manager node 140a (on bare metal), it may alternatively be run within a virtual machine or within a "container," i.e., a virtualized userspace process (e.g., a Docker container).

Figure 3:
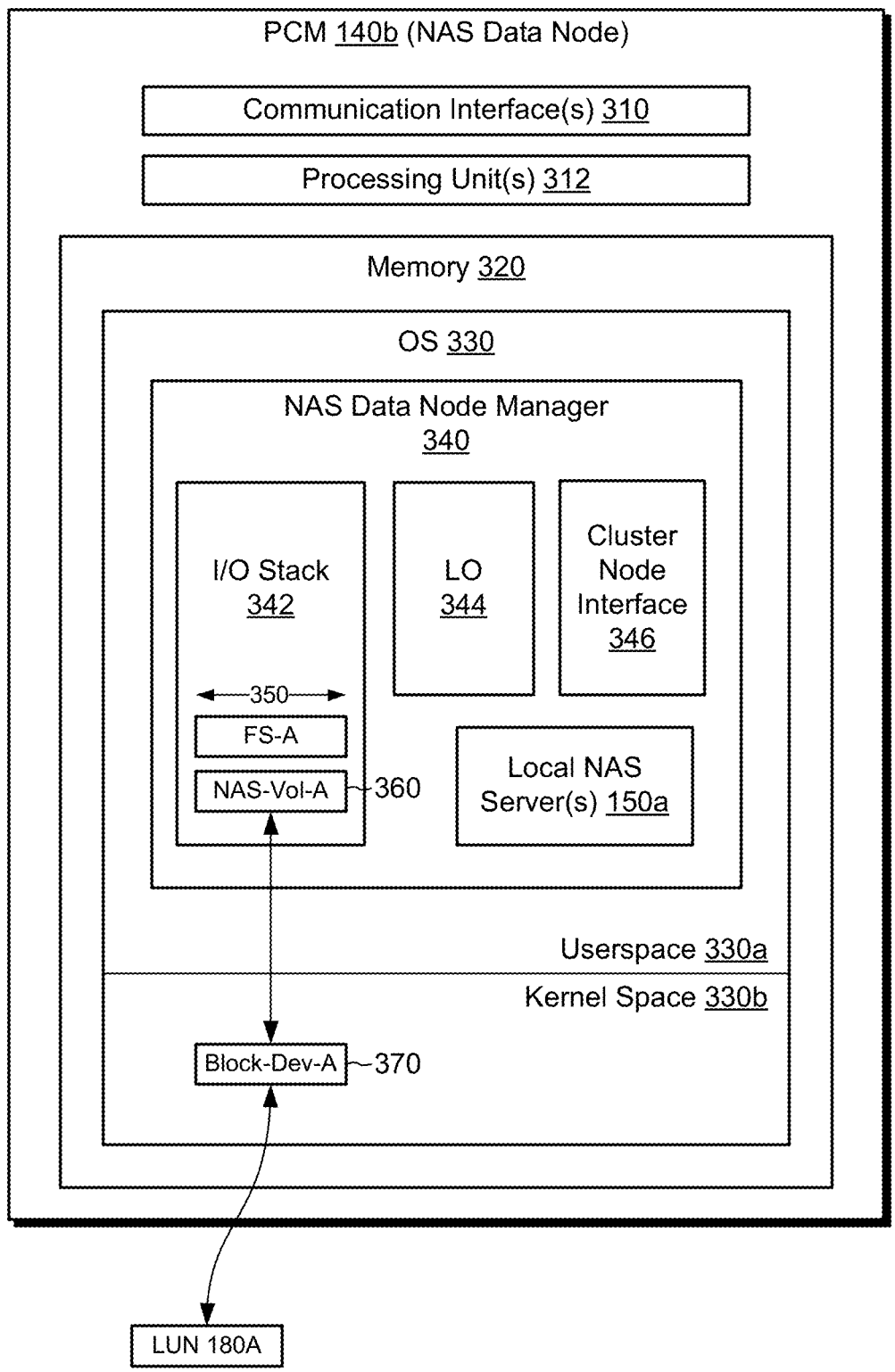
FIG. 3 is a block diagram of an example physical computing machine of the NAS cluster of FIG. 1 configured as a NAS data node.

FIG. 3 shows an example implementation of a physical computing machine configured as a NAS data node 140b. Physical computing machine 140b is intended to be representative of physical computing machines 140-2 through 140-M in FIG. 1.

NAS data node 140b includes one or more communication interfaces 310, a set of processing units 312, and memory 320, which may be configured similarly to the communication interfaces 210, set of processing units 212, and memory 220 of the cluster manager node 140a described above. In some examples, however, processors and memory on NAS data node 140b may be optimized for moving data and may thus include greater numbers of processing cores and/or larger amounts of memory. The set of processing units 312 and the memory 320 together form control circuitry, which is constructed and arranged to carry out various methods and functions as described herein. Also, the memory 320 includes a variety of software constructs realized in the form of executable instructions. When the executable instructions are run by the set of processing units 312, the set of processing units 312 of the NAS data node 140b is caused to carry out the operations defined by the software constructs. Although FIG. 3 specifically shows certain software constructs, it is understood that the memory 320 typically includes many other software constructs.

As further shown in FIG. 3, the memory 320 includes an operating system (OS) 330 (e.g., Linux, Unix, Windows, etc.), which includes userspace 330a and kernel space 330b. A NAS data node manager 340 runs within userspace 330a, e.g., as a userspace process, and includes the following software constructs:

I/O Stack 342. An execution path for processing I/O requests 112 arriving from hosts 110. Converts read and/or write requests directed to particular files or directories in specified file systems to corresponding block-based requests suitable for submission to block storage 170.

Local Orchestration 344. Manages procedures involving data storage and services within NAS data node 140b.

Cluster Node Interface 346. A management/control interface to cluster manager 160, e.g., via data node interface 244 in cluster manager node 140a.

Local NAS Server(s) 150a. NAS servers 150 hosted by this NAS data node 140b. Each of NAS servers 150a has its own FSDB 152 for tracking its own file systems.

FIG. 3 further shows an example relationship between a file system of a NAS server 150a and a LUN that backs the file system. The illustrated arrangement is intended to be representative of file system deployments across the NAS cluster 130. Here, a single file system FS-A is represented within the I/O stack 342. In an example, the file system FS-A has a continuous address space 350, which is denominated in blocks, for example, where a "block" is a smallest unit of storage that may be allocated by the file system. The I/O stack 342 maps reads and/or writes directed to FS-A to corresponding reads and/or writes of corresponding blocks within the address space 350. The file system FS-A is itself laid out on a NAS volume 360 (NAS-Vol-A), which is constructed in userspace 330a. NAS-Vol-A is itself laid out on a kernel-based block device 370 (Block-Dev-A), such as a Linux block device. Block-Dev-A itself is built upon a LUN 180A provided from block storage 170.

In an example, the cluster manager 160 directs activities to configure the illustrated arrangement, such as by provisioning LUN 180A to NAS data node 140b, such that the operating system 330 discovers LUN 180A and expresses it as a block device 370 (e.g., a Linux block device), which resides in kernel space 330b. The NAS data node manager 340 discovers Block-Dev-A and constructs NAS volume NAS-Vol-A upon Block-Dev-A (in Linux, developers may use libaio for this purpose). The NAS data node manager 340 may then format FS-A on NAS-Vol-A. In an example, there is a one-to-one relationship between each file system address in address space 350 and a corresponding address in each of NAS-Vol-A, Block-Dev-A, and LUN 180A, such that reads and writes directed to a particular block address in address space 350 translate to reads and writes of a corresponding block in LUN 180A.

Although FIG. 3 shows an example arrangement for implementing a single file system FS-A, one should appreciate that the NAS data node manager 340 may support many file systems, which may number in the thousands, in a similar manner. Thus, for example, each file system available from the NAS data node 140b is laid out on an associated NAS volume 360 in userspace 330a, which is built upon a block device 370 in kernel space 330b, which is in turn built upon an LUN 180 in block storage 170.

In an example, the NAS cluster 130 maintains uniqueness of identifiers of block devices that support file systems across the entire NAS cluster 130 (in Linux, developers may use udev may for this purpose). For example, the cluster manager 160 coordinates with each NAS data node 140b to ensure that each block device 370 supporting a file system has a unique ID (identifier) within the NAS cluster 130. Moreover, the NAS cluster 130 ensures that such block device IDs supporting file systems do not change, even when the NAS servers 150 that contain the file systems are moved from one NAS data node 140b to another. Thus, for example, the unique ID of a block device 370 supporting a file system stays the same across the NAS cluster 130, regardless of which node is realizing the block device 370.

Figure 4:
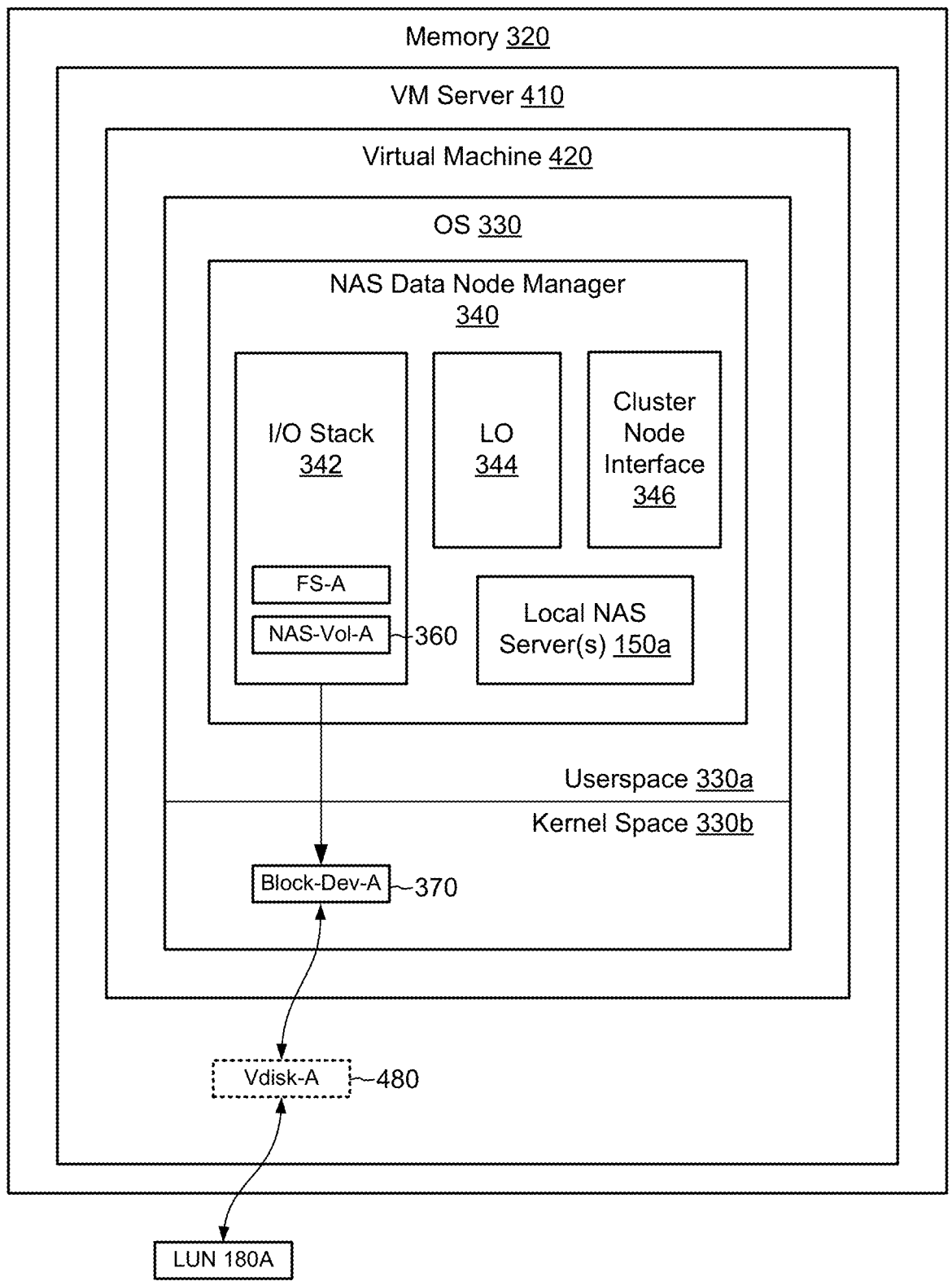
FIG. 4 is a block diagram showing an example NAS data node running within a virtual machine.

FIG. 4 shows another example arrangement for realizing a NAS data node 140b. Certain features in common with the example of FIG. 3 are omitted for the sake of clarity. The arrangement of FIG. 4 differs from that of FIG. 3 in that the operating system 330 in FIG. 4 runs within a virtual machine 420. The virtual machine 420 runs under a virtual machine server 410. In an example, the virtual machine server 410 is vSphere ESX server, available from VMWare, Inc., of Palo Alto, Calif. (now part of Dell Corporation). The virtual machine 420 is a VMWare virtual machine. Other virtual machine technologies may be used, such as KVM (kernel-based virtual machine) and Microsoft Hyper-V.

As shown in FIG. 4, the virtual machine 420 imposes additional layers, which the NAS cluster 130 must manage when deploying file systems backed by LUNs 180 in block storage 170. In this case, the cluster manager 160 directs block storage 170 to provision LUN 180A to the virtual machine server 410. The virtual machine server 410 creates a vdisk 480 (Vdisk-A) from the LUN 170A and provisions the vdisk 480 to the virtual machine 420. The operating system 330 (e.g., Linux) running within the virtual machine 420 discovers the vdisk 480 and creates a kernel-based block device 370. As before, the NAS data node 340 discovers the block device 370, builds a NAS volume 360 on the block device 370, and formats out the file system upon the NAS volume 360. The one-to-one address correspondence described above also applies to the vdisk 480, as well as to the NAS volume 360, block device 370, and LUN 180A.

Figure 5:
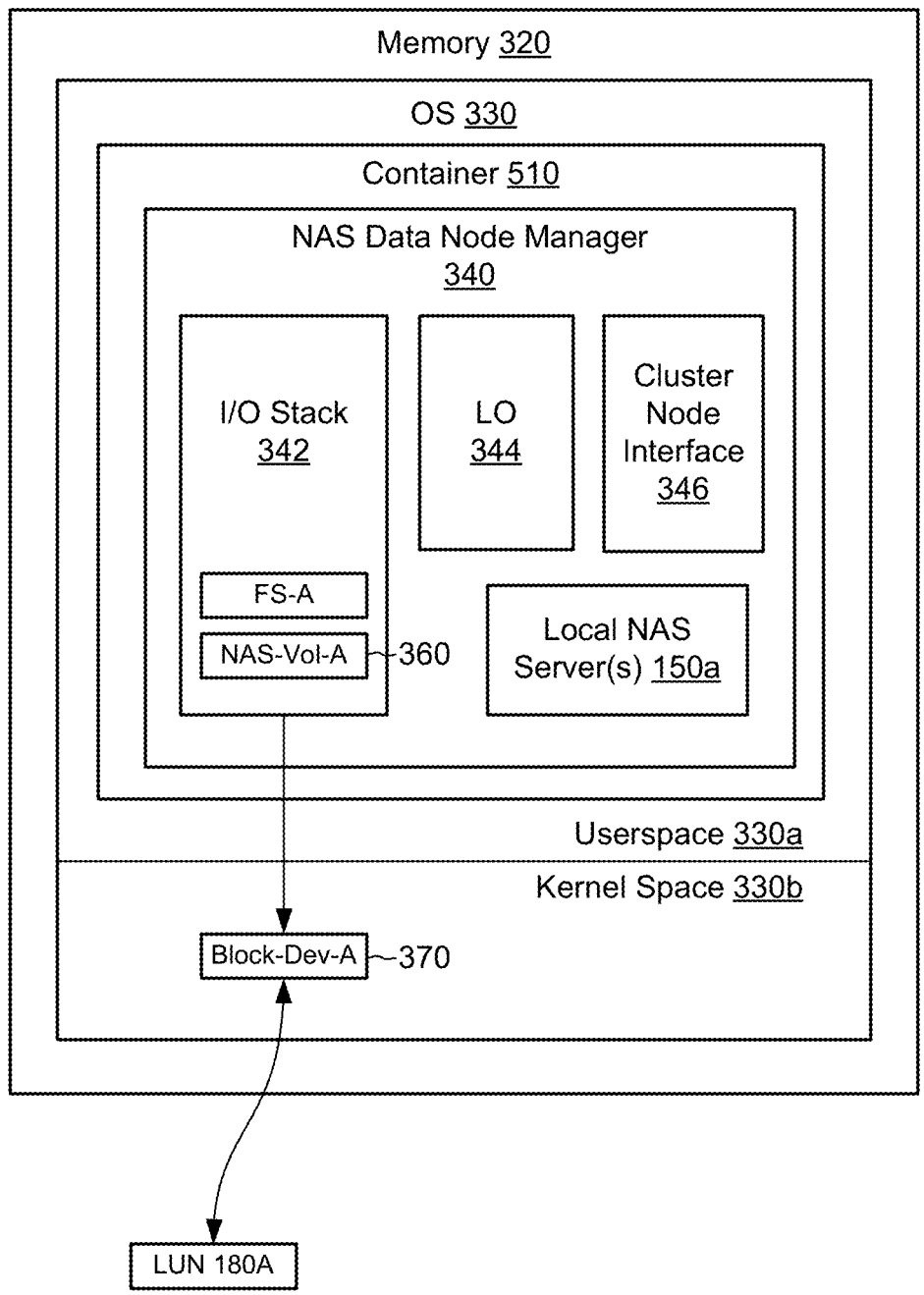
FIG. 5 is a block diagram showing an example NAS data node running within a container that provides a virtualized userspace environment.

FIG. 5 shows yet another example arrangement for realizing a NAS data node 140b. Here, the NAS data node 340 runs within a container 510, i.e., a virtualized userspace instance. The NAS data node 340 may run multiple containers, like the container 510, with each container providing a userspace execution environment that is isolated from similar environments provided by other containers. Unlike virtual machines, containers do not virtualize the OS kernel. Rather, all containers share the same kernel. Examples of containers 510 include Docker containers, available from Docker, Inc.

When using virtual machines or containers, it may be desirable to run the cluster manager 160 and the NAS data node manager 340 together on the same physical computing machine 140. For example, the cluster manager 160 may run in one virtual machine or container while the NAS data node manager 340 runs in another. Thus, it is not necessary for the cluster manager 160 to consume an entire physical computing machine 140 in the NAS cluster 130.

Figure 6:
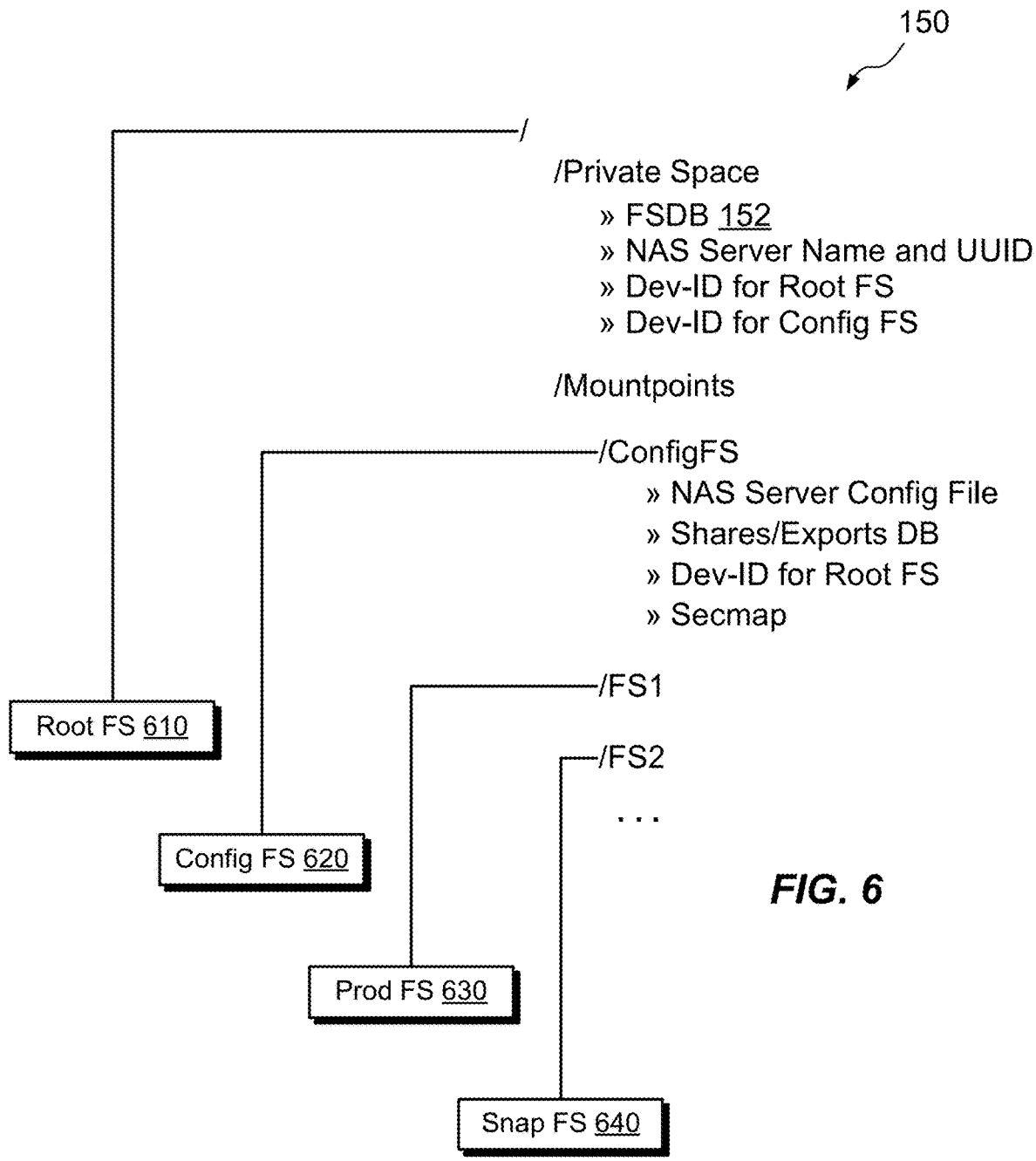
FIG. 6 shows an example arrangement of a file system in a NAS server.

FIG. 6 shows example features of a NAS server 150 in additional detail. Although a particular NAS server is shown, the illustrated structure is intended to be representative of NAS servers 150 in general. As shown, the NAS server 150 includes a root file system 610, a config file system 620, and any number of user file systems, which may include both production file systems and snapshots (others supported types of file systems may include migration targets). In the example shown, the NAS server 150 includes two user file systems. File system 620 is a production file system, and file system 640 is a snapshot.

The root file system 610 has a directory structure, which includes, for example, a root directory (slash), a "/Private Space" directory, and a "/Mountpoints" directory. In an example, the Private Space directory includes the above-described FSDB 152. Thus, for example, the FSDB 152 is itself implemented within a file system of the NAS server 150. In an example, the FSDB 152 tracks user file systems, such as file systems 630 and 640, but does not track the root file system 610 or the config file system 620. The Private Space directory may also include the following:

NAS Server Name and UUID. The NAS server 150 has a name, which may be user-assigned or automatically assigned, and a UUID (universally unique identifier).

Dev-ID for Root FS. A unique identifier of a block device 370 that supports the root file system 610. In an example, the root file system 610 is deployed within a NAS data node 340 using the same structure as described for FS-A in connection with FIGS. 3-5.

Dev-ID for Config FS. A unique identifier of a block device 370 that supports the config file system 620. In an example, the config file system 620 is implemented within a NAS data node 340 using the same structure as described for FS-A in connection with FIGS. 3-5.

In some examples, the root file system 610 also stores redundant information, which the NAS cluster 130 may use to rebuild the management database 162, e.g., in the event of a failure of the cluster manager 160.

The config file system 620 stores configuration information describing the NAS server 150, such as a NAS server configuration file, a database of shares/exports, the Dev-ID for the Root FS (described above), and a secmap.

The Mountpoints directory in the root file system 610 exposes mount points on which other file systems may be mounted to join their namespaces. For example, the NAS data node manager 340 may mount the config file system 620 and each of the user file systems (630 and 640) on respective mount points in the Mountpoints directory to join their namespaces. The resulting namespace is specific to the NAS server 150 but is independent of the namespaces of other NAS servers (unless they are joined through other means).

In the arrangement shown, the FSDB 152 resides within the root file system 610 and thus moves wherever the root file system 610 moves. Thus, for example, when performing failover, load balancing, or other operations, a NAS data node 140b that takes over operation of a NAS server 150 can identify all of the NAS server's user file systems based only on receipt of the root file system 610.

FIG. 7 shows example information stored in each FSDB 152. For each user file system that belongs to a NAS server 150, the FSDB 152 for that NAS server 150 stores the following information.

File System Name. May be user-defined or automatically defined.

Export FSID. File system identifier (e.g., UUID or 32-bit value) used when file system is a replication or migration target.

Internal FSID. File system identifier (e.g., UUID) used to identify a file system within NAS cluster 130.

File System State. Whether the file system is currently mounted or unmounted.

Dev-ID of File System. Identifier of kernel-based block device 370 (e.g., Linux block device) which supports the file system. Unique within NAS cluster 130 and invariant as NAS server 150 is moved from one physical computing machine 140 to another.

Mount Point Name and Options for File System. The mount point to which this file system is mounted in the Mountpoints directory of the root file system of this NAS server 150, as well as mount options (e.g., read-write, read-only, etc.). For example, the mount point for production file system 630 in FIG. 6 is shown as "/FS1."

Maximum Provisioned Capacity of File System. The maximum size to which the file system can grow. Specified, for example, when file system is created.

Nature of File System. Whether the file system is a production (primary) file system, a snapshot, or a migration target.

The elements of information listed in FIG. 7 promote efficiency in the NAS cluster 130. Some elements may be omitted and others that are not shown may be added. The listed elements are not intended to be exhaustive or to present strict requirements but are rather illustrative.

FIG. 8 shows example information stored in the management database 162. As indicated, the management database 162 organizes information both by tenant and by NAS server 150. As is known, a "tenant" is an entity on whose behalf data are stored, such as a company, some other type of organization, or a user. The NAS cluster 130 may store the data of multiple tenants and enforce strict measures to keep different tenants' data separate. For each tenant storing data in the NAS cluster 130, the management database 162 stores the following:

Tenant Name. A name of the tenant, such as "ACME Industries."

Tenant UUID. A universally unique identifier of the tenant.

ID of each NAS Node Exclusively Owned. An identifier of each NAS data node 140*b* (or, equivalently, of each NAS data node manager 340) that the tenant exclusively owns. Exclusively owned NAS nodes are available for storing only the owning tenants' data.

ID of each NAS Node Shared. An identifier of each NAS data node (or, equivalently, of each NAS data node manager 340) that the tenant does not exclusively own, but which the tenant may share with other tenants. A shared NAS node cannot be owned by any tenant.

In addition to this per-tenant information, the management database 162 also stores the following information for each NAS server 150:

Tenant UUID. A universally unique identifier of the tenant that owns the NAS server 150.

NAS Node ID. An identifier of the NAS data node 140*b* on which the NAS server 150 is currently operating.

NAS Server Name. A name of the NAS server 150. May be user-defined or automatically defined.

NAS Server UUID. A universally unique identifier of the NAS server 150.

State. The state of the NAS server 150, such as normal (operational), destination (the target of replication or migration), or offline.

Unique Dev-ID and LUN for Root FS. A unique identifier of a block device 370 that supports the root file system 610 (Dev-ID), and an identifier of the LUN in block storage 170 that backs that block device 370. "LUN" in this case refers to the logical unit number of the LUN and hence is an identifier.

Unique Dev-ID and LUN for Config FS. A unique identifier of a block device 370 that supports the config file system 620 (Dev-ID), and an identifier of the LUN in block storage 170 that backs that block device 370.

Unique Dev-ID and LUN for each User File System. For each user file system, a unique identifier of the block device 370 that supports that user file system (Dev-ID), and an identifier of the LUN in block storage 170 that backs that block device 370.

The particular data elements described above are intended to be illustrative rather than limiting.

One should appreciate that the illustrated example provides LUN information only in the management database 162 (FIG. 8) but not in the FSDB 152 (FIG. 7). In addition, only the FSDB 152 provides file system names and FSIDs. The illustrated distribution of information between the management database 162 and the FSDBs 152 is intended to reduce reliance on the cluster manager 160 when performing most data management tasks, while also providing the cluster manager 160 with the information it needs to support its role in managing the NAS cluster 130.

FIGS. 9-13 show example sequences for performing various activities in the NAS cluster 130. Each of these figures identifies nodes in the NAS cluster 130 according to their roles as cluster manager 160 and NAS data nodes (labeled A-M), rather than by physical computing machines 140. It should be noted that activities ascribed below to the NAS data nodes A-M may be performed by the NAS data node managers 340 running on the respective NAS data nodes.

Figure 9:
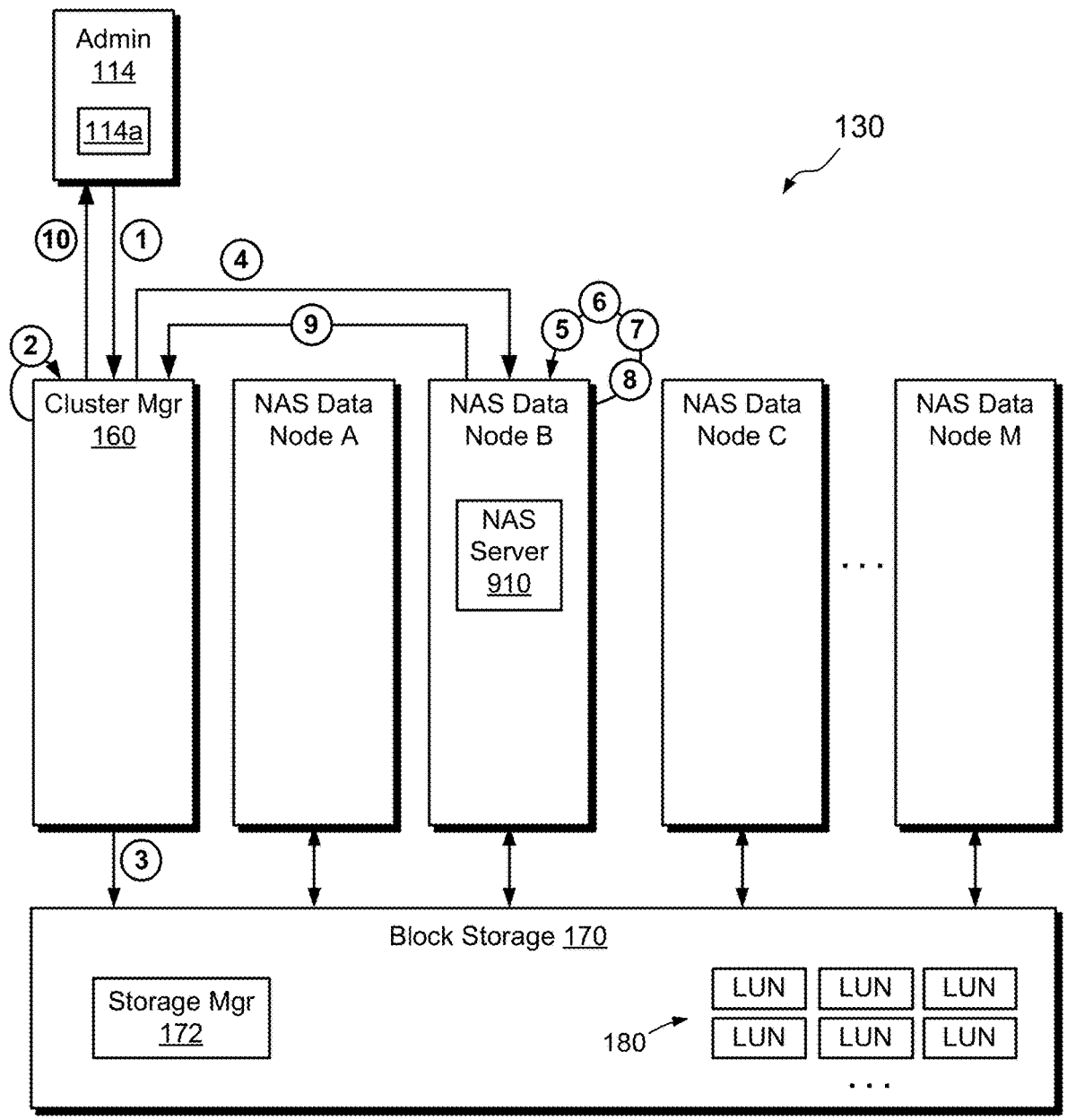
FIG. 9 shows an example sequence for creating a new NAS server in the NAS cluster of FIG. 1.

FIG. 9 shows an example sequence for creating a NAS server 910 in the NAS cluster 130. The encircled numerals depict the following example sequence of operations:

1. Receive, by cluster manager 160, a request from administrative program 114*a* to create NAS server 910 on NAS data node B. The instruction may be issued by an administrator or other user and may include a name of the NAS server 910.
2. Allocate, by cluster manager 160, UUID of NAS server 910.
3. Allocate, by cluster manager 160, two new unique device IDs for block devices 370 that support the root file system 610 and the config file system 620 of the NAS server 910; direct block storage 170 to allocate two LUNs 180, one for the root file system 610 and another for the config file system 620; bind together the unique device ID for the root file system with the LUN for the root file system; bind together the unique device ID for the config file system with the LUN for the config file system.
4. Cluster manager 160 calls into NAS data node B and provides NAS server name, UUID, and device IDs of block devices 370 that support root file system 610 and config file system 620.
5. NAS data node B formats root file system and config file system over respective block devices 370.
6. NAS data node B mounts root file system 610 as "l" and config file system 620 as "/ConfigFS" (see FIG. 6).
7. NAS data node B initializes config file system 620 (e.g., Shares/Exports DB and NAS Server Config File); initializes FSDB 152 in root file system.
8. NAS data node B records name and UUID of NAS server 910 in root file system 610; records device ID of block device 370 supporting root file system 610 and device ID block device 370 supporting config file system 620; records in FSDB 152 device IDs of block devices 370 supporting user file systems, if any; records redundant information stored in management database 162.
9. Cluster manager 160 records information about NAS server 910 in management database 162 (e.g., in per-NAS-server information; see FIG. 8).
10. Cluster manager 160 acknowledges request received in step 1.

As shown, the actions performed to provision the NAS server are kept mostly within the NAS data node B, with limited interactions with block storage 170.

Figure 10:
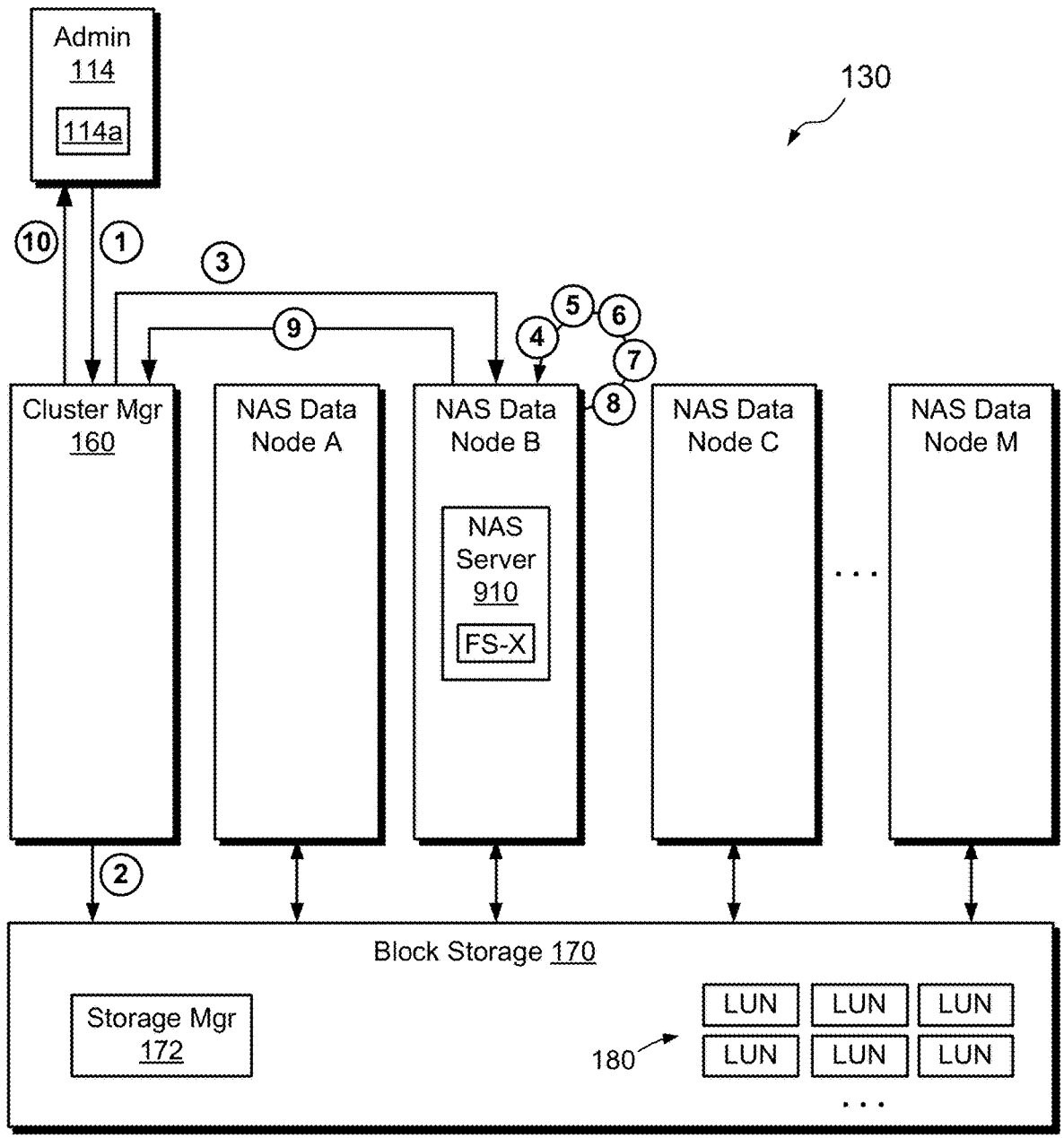
FIG. 10 shows an example sequence for creating a new file system within a NAS server.

FIG. 10 shows an example sequence for creating a file system in the NAS cluster 130. The encircled numerals in FIG. 10 depict the following example sequence of operations:

1. Receive, by cluster manager 160, a request from administrative program 114*a* to create a file system FS-X on NAS data node B. The instruction may be issued by an administrator or other user and may include a name of the NAS server 910.
2. Allocate, by cluster manager 160, a new device ID for a block device 370 that supports the file system FS-X; direct block storage 170 to allocate a LUN 180 for FS-X; bind together the unique device ID with the LUN for FS-X.
3. Cluster manager 160 calls into NAS data node B and provides NAS server UUID, device ID of block device 370 that supports FS-X, as well as Maximum Provisioned Capacity of FS-X, Mount Point Name and Options for FS-X, and the Nature of FS-X, e.g., production, snapshot, or migration.
4. NAS data node B allocates UUID for FS-X. If nature of file system is "Production," the same UUID is used for both Export FSID and Internal FSID.
5. NAS data node B formats the new file system on the block device 370 indicated by the received device ID.

6. NAS data node B creates a mount point on the root file system 610 of the NAS server 910.
7. NAS data node B records information about FS-X in the FSDB 152 of NAS server 910.
8. NAS data node B mounts FS-X.
9. Cluster manager 160 updates management database 162 for NAS server 910 with newly allocated device ID of block device 370 and LUN for FS-X.
10. Cluster manager 160 acknowledges request received in step 1.

Here, as well, the actions performed are mostly kept within the NAS data node B, with limited interactions with block storage 170.

Figure 11:
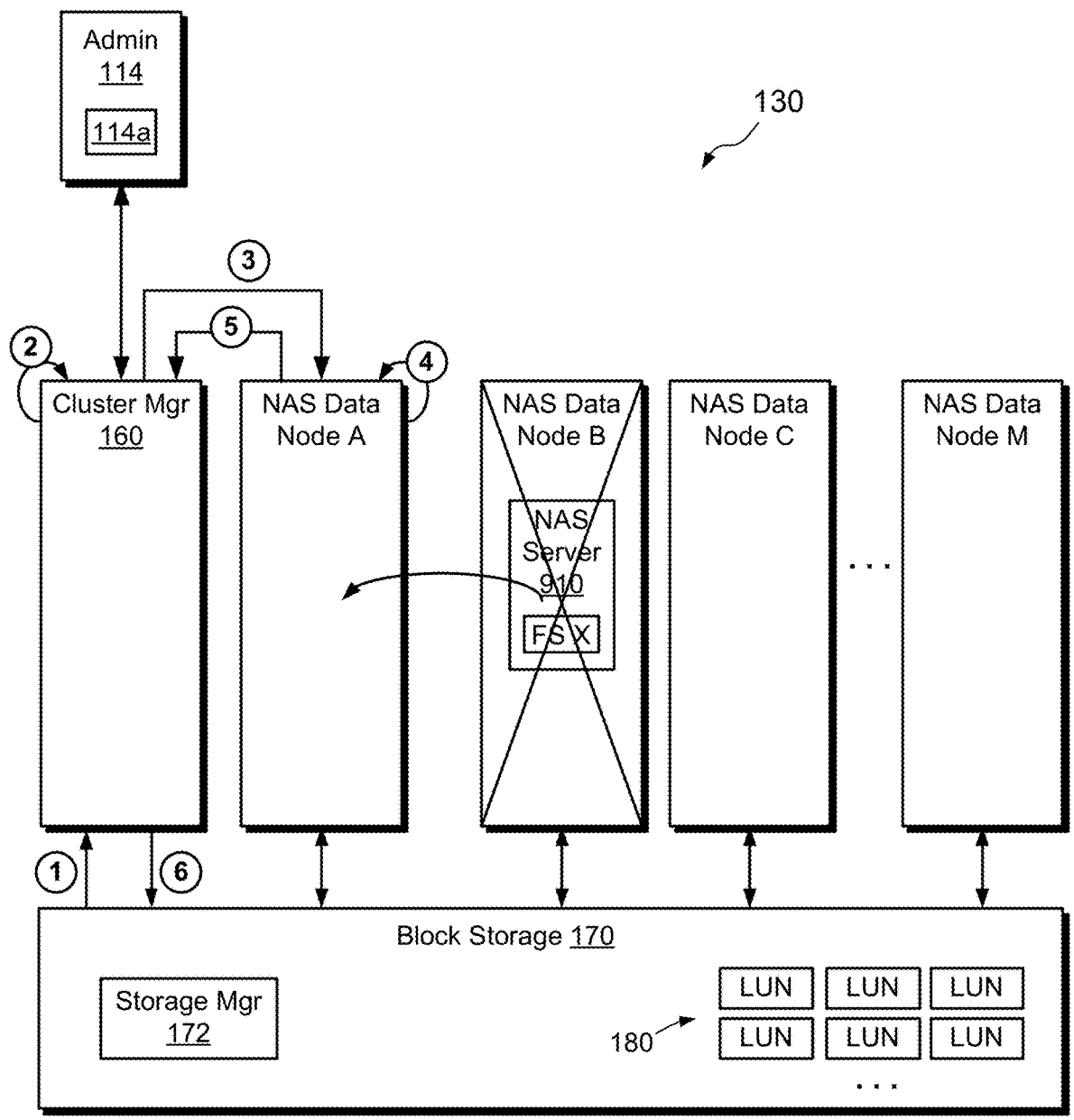
FIG. 11 shows an example sequence for performing failover.

FIG. 11 shows an example sequence for conducting failover of a NAS data node in the NAS cluster 130. The encircled numerals in FIG. 11 depict the following example sequence of operations:

1. Receive, by cluster manager 160, a notification from block storage 170 that NAS data node B has failed. Alternatively, the cluster manager 160 monitors an operational state of each of the NAS data nodes and detects on its own that NAS data node B has failed.
2. Cluster manager 160 accesses management database 162 and changes NAS Node ID (FIG. 8) for NAS server 910 to NAS data node A.
3. Cluster manager 160 calls into NAS data node A and provides name of NAS server 910, UUID of NAS server 910, and device IDs of block devices 370 that support root file system 610 and config file system 620 of NAS server 910. In some examples, the cluster manager 160 may reassign the LUNs 180 that back the root file system 610, config file system 620, and each of the user file systems of NAS server 910 from NAS data node B to NAS data node A.
4. NAS data node A brings up NAS server 910.
5. NAS data node A indicates that NAS server 910 is operational.
6. Cluster manager 160 acknowledges completion of failover.

In some examples, the cluster manager 160 monitors not only operational state, but also spare capacity of each of the NAS data nodes. The cluster manager 160 then bases its determination of failover node at least in part on spare capacity. For example, the cluster manager 160 may have determined that NAS data node A was not very busy, or was less busy than other nodes, such that it was a good candidate for receiving NAS server 910.

In some examples, the failing NAS data node may support numerous NAS servers 150, which become stranded by the failure of that NAS data node. In such examples, the cluster manager 160 may transfer operation of the stranded NAS data nodes based at least in part on spare capacity of still-functioning NAS data nodes, performing load balancing in the process. For example, the cluster manager 160 may distribute the stranded NAS servers across multiple NAS data nodes in the cluster 130, so as to balance workload across NAS data nodes and to avoid overloading any one NAS data node.

Some virtual machine platforms support their own mechanisms for failover. For example, VMWare uses vMotion to support movement of virtual machines from one physical computer to another. In examples where NAS data nodes operate within virtual machines, such as in FIG. 4, virtual machine failover may be disabled for NAS data nodes, such that the cluster manager 160 remains in control of the placement of NAS servers 150 in the NAS cluster 130.

In some examples, virtual machine failover may be preserved for the cluster manager 160 itself. For instance, in cases where the cluster manager 160 runs in a virtual machine and a failure occurs in that virtual machine or in the associated physical computing machine, vMotion or similar procedures may restore operation of the cluster manager 160 from a different physical computing machine.

Figure 12:
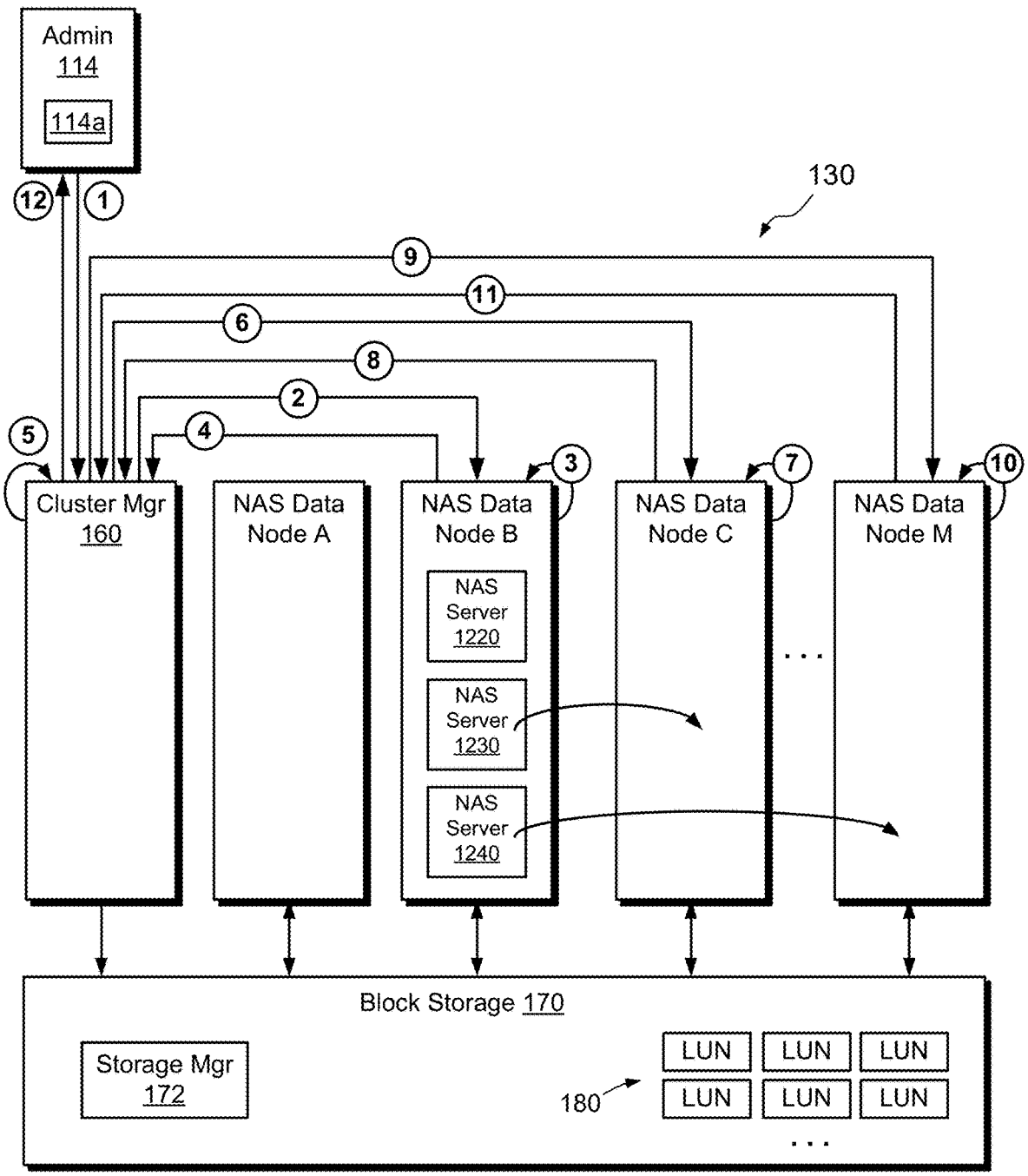
FIG. 12 shows an example sequence for performing load balancing.

FIG. 12 shows an example sequence for performing load balancing in the NAS cluster 130. The mechanics for load balancing are similar to those for performing failover, except that there is no failing node. In an example, the sequence proceeds as follows:

1. Receive, by cluster manager 160, a notification from block storage 170 that NAS data node B is overloaded. Alternatively, in some examples, the cluster manager 160 itself monitors the spare capacity of NAS data nodes and detects on its own that NAS data node B is overloaded, e.g., by determining that the spare capacity has fallen below a predetermined threshold.
2. Cluster manager 160 calls in to NAS data node B and directs it bring down one or more of its NAS servers. In this example, the cluster manager 160 directs NAS node B to bring down NAS servers 1230 and 1240, but not NAS server 1220.
3. NAS data node B brings down NAS server 1220 and NAS server 1230.
4. NAS data node B acknowledges to cluster manager 160 that NAS servers 1220 and 1230 are down.
5. Cluster manager 160 accesses management database 162, changes NAS Node ID (FIG. 8) for NAS server 1230 to NAS data node C, and changes NAS Node ID for NAS server 1240 to NAS data node M. The cluster manager 160 may previously have determined that NAS data nodes C and M have spare capacity and are good candidates for receiving NAS servers 1230 and 1240.
6. Cluster manager 160 calls into NAS data node C and provides name of NAS server 1230, UUID of NAS server 1230, and device IDs of block devices 370 that support root file system 610 and config file system 620 of NAS server 1230. In some examples, cluster manager 160 may reassign the LUNs 180 that back the root file system 610, config file system 620, and each of the user file systems of NAS server 1230 from NAS data node B to NAS data node C.
7. NAS data node C brings up NAS server 1230.
8. NAS data node C indicates that NAS server 1230 is operational.
9. Cluster manager 160 calls into NAS data node M and provides name of NAS server 1240, UUID of NAS server 1240, and device IDs of block devices 370 that support root file system 610 and config file system 620 of NAS server 1240. In some examples, the cluster manager may reassign the LUNs 180 that back the root file system 610, config file system 620, and each of the user file systems of NAS server 1240 from NAS data node B to NAS data node M.
10. NAS data node M brings up NAS server 1240.
11. NAS data node M indicates that NAS server 1240 is operational.
12. Cluster manager 160 acknowledges completion of load balancing.

The order of activities above can be varied. For example, movement of NAS server 1230 may be performed completely before initiating movement of NAS server 1240.

Alternatively, the acts for moving NAS servers 1230 and 1240 may be performed in parallel or interleaved in any suitable manner.

Figure 13:
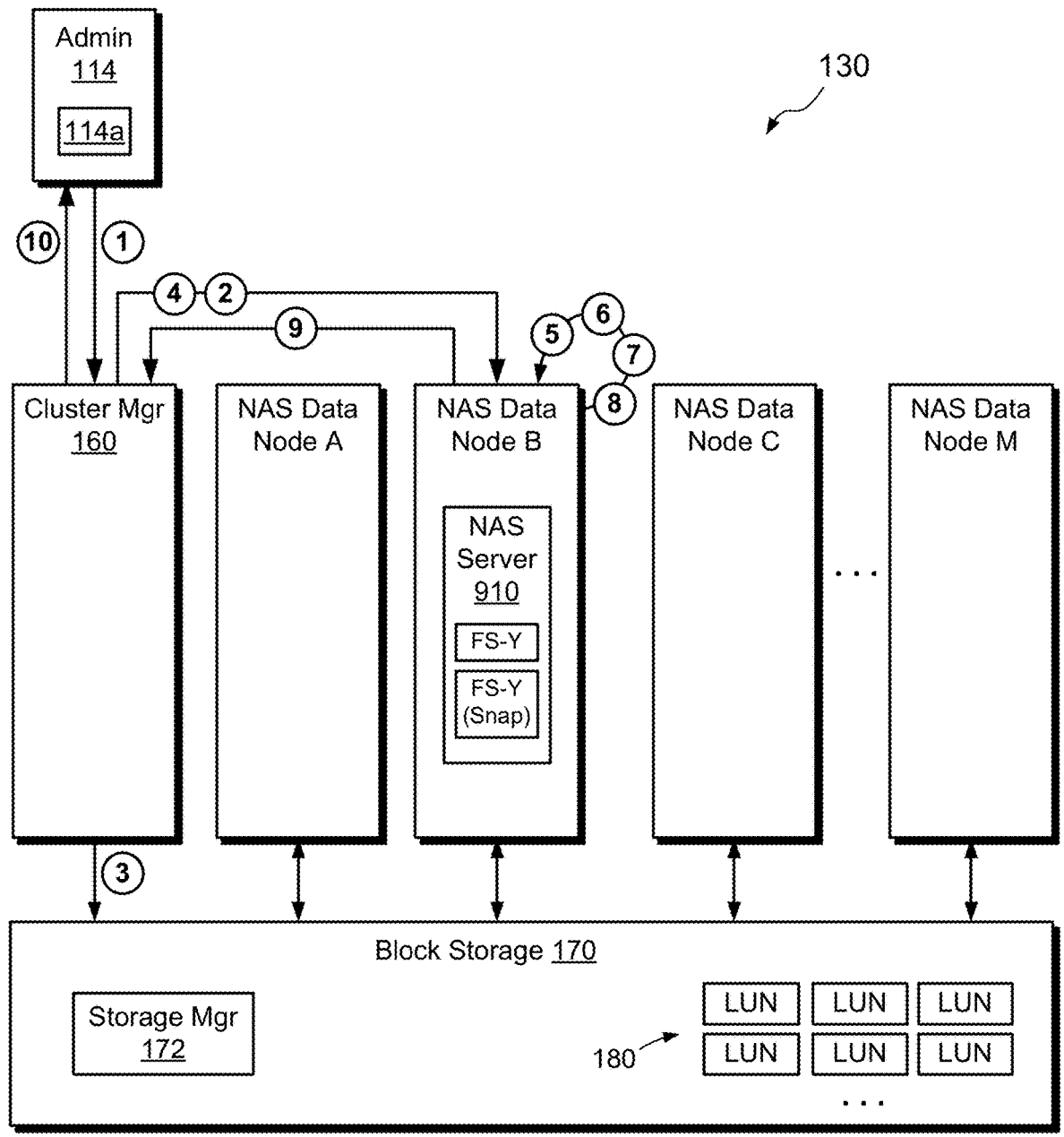
FIG. 13 shows an example sequence for generating a snapshot.

FIG. 13 shows an example sequence for creating a snapshot FS-Y (Snap) of a file system FS-Y in the NAS cluster 130. As will be apparent, the cluster manager 160 directs the creation of the snapshot and the block storage 170 performs the underlying snapshot activities. An example sequence proceeds as follows:

1. Receive, by cluster manager 160, a request to create a snapshot of FS-Y in NAS server 910.
2. Cluster manager 160 queries NAS server 910 to obtain, from its FSDB, device ID of block device 370 that supports FS-Y. This device ID is referred to herein as "DEV-ID(Y)."
3. Cluster manager 160 accesses management database 162 and identifies the LUN 170 "LUN(Y)" associated with DEV-ID(Y); cluster manager 160 calls into block storage 170 and directs block storage 170 to create a snapshot of the LUN(Y); block storage 170 creates a new LUN "LUN(YS)" as a snapshot of LUN(Y); block storage 170 also creates a new device ID "DEV-ID (YS)" for a block device 370 that will support LUN (YS); Cluster manager 160 returns LUN(YS) identifier and DEV-ID(YS) to the cluster manager 160.
4. Cluster manager 160 calls into NAS data node B and provides UUID of NAS server 910, DEV-ID(YS), mount point, and designation as "Snapshot."
5. NAS data node B allocates new FSID for the new snapshot FS-Y (Snap). For snapshot purposes, NAS data node B applies the same new FSID for both Export FSID and Internal FSID.
6. NAS data node B creates new mount point on the root file system 610 of NAS server 910.
7. NAS data node B records received information about the new file system (the snapshot) in the FSDB 152 of NAS server 910.
8. NAS data node B mounts the new file system (the snapshot).
9. NAS data node B acknowledges success; cluster manager 160 updates management database 162 for NAS server 910 with newly created DEV-ID(YS) and LUN (YS).
10. Cluster manager 160 acknowledges completion of snapshot request.

Figure 14:
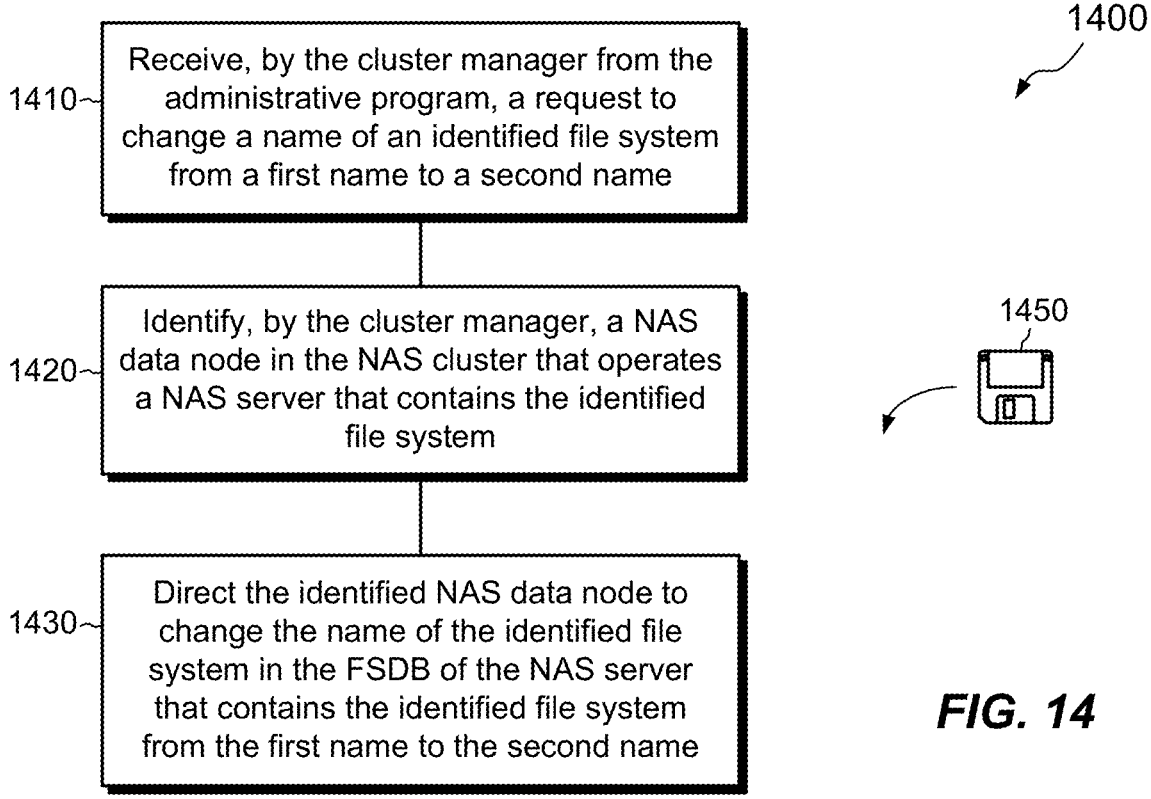
FIG. 14 is a flowchart showing an example method for renaming a file system.
Figure 15:
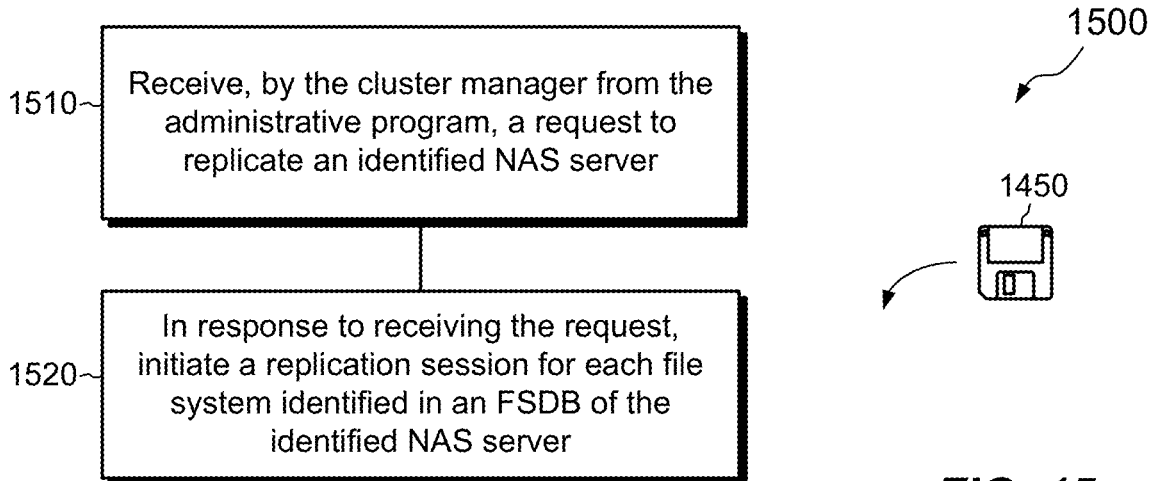
FIG. 15 is a flowchart showing an example method of performing replication.
Figure 16:
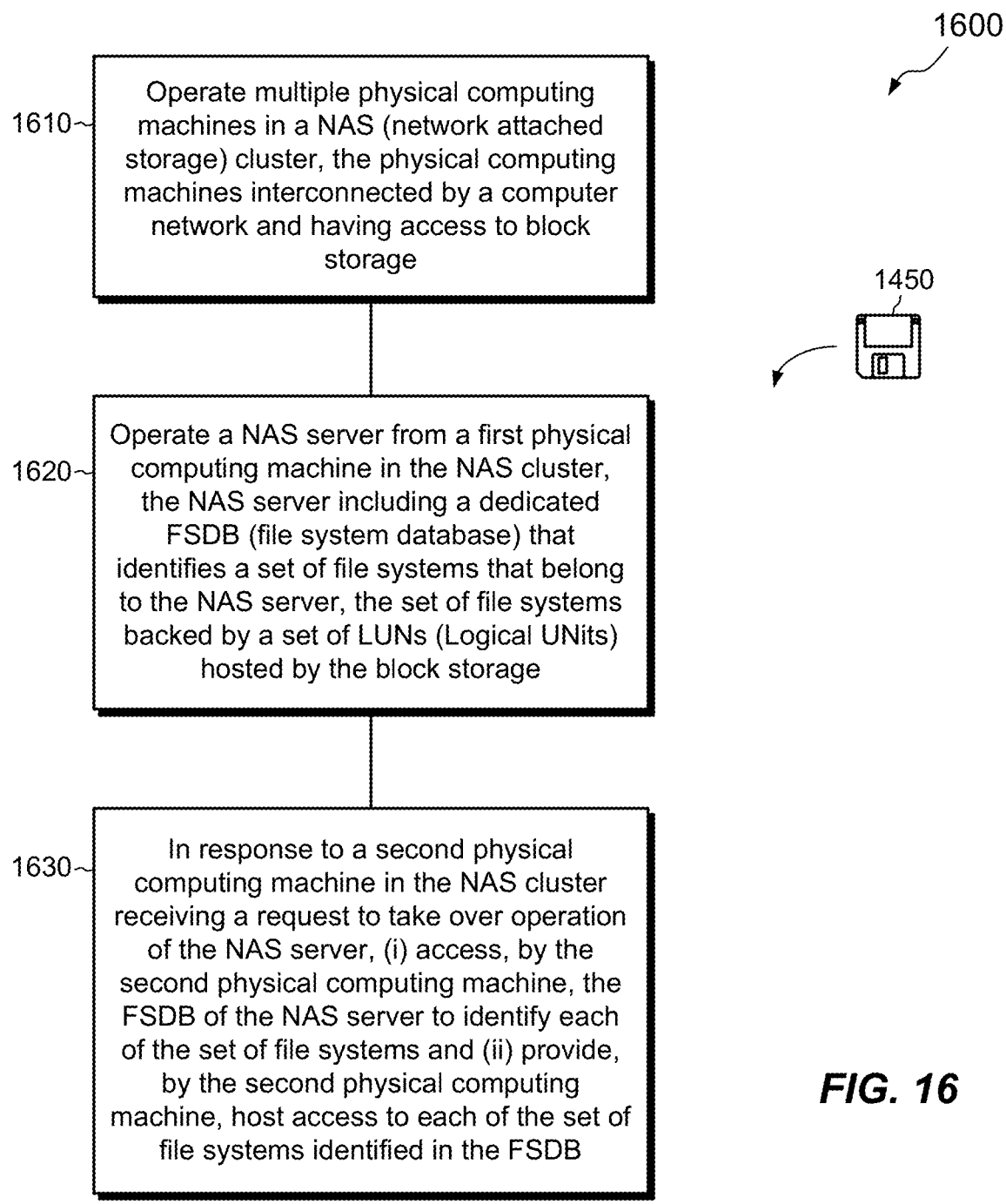
FIG. 16 is a flowchart showing an example method of managing data storage.

FIGS. 14-16 show example methods 1400, 1500, and 1600 that may be carried out in connection with the environment 100. The methods 1400, 1500, and 1600 are typically performed, for example, by the software constructs described in connection with FIGS. 1-3, which reside in the memory 220 and 320 of the respective physical computing machines 140a and 140b and are run by the respective sets of processing units 212 and 312. The various acts of methods 1400, 1500, and 1600 may be ordered in any suitable way. Accordingly, embodiments may be constructed in which acts are performed in orders different from those illustrated, which may include performing some acts simultaneously.

FIG. 14 shows an example method 1400 for changing the name of a file system and demonstrates an example distribution of information between the cluster manager 160 and the NAS data nodes.

At 1410, the cluster manager 160 receives a request, e.g., from administrative program 114a, to change the name of an identified file system from a first name, such as "myFS" to a second name, such as "yourFS."

At 1420, the cluster manager 160 identifies the NAS data node in the NAS cluster 130 that operates the NAS server 150 which contains the identified file system. For example, the cluster manager 160 may broadcast a request that specifies the name myFS to all NAS data nodes in the NAS cluster 130. Each NAS data node may then query its own FSDBs 152 (e.g., the FSDBs for all NAS server 150 that it hosts). The NAS data node that finds myFS in one of its FSDBs responds to the request and identifies itself to the cluster manager 162.

At 1430, the cluster manager 160 directs the identified NAS data node to change the name of the file system from myFS to yourFS in the FSDB 152 of the NAS server that contains the identified file system. In an example, no changes are made in the management database 162, as this database does not track file system names.

FIG. 15 shows an example method 1500 for performing replication in the NAS cluster 130. At 1510, the cluster manager 160 receives a request from administrative program 114a to replicate an identified NAS server 150. One should appreciate that the request is to replicate a NAS server, rather than any individual file systems. Thus, replication is requested here at per-NAS-server granularity.

At 1520, in response to the request to replicate the NAS server, the cluster manager 160 identifies each file system listed in the FSDB 152 for that NAS server 150 and proceeds to initiate a replication session for each identified file system. Replication activities then proceed together for all identified file systems. The underlying replication transport may be synchronous, as in continuous replication, and/or asynchronous, as in snapshot-shipping replication. The cluster manager 160 orchestrates replication activities. The replication transport may be operated by the NAS data nodes, by the block storage 170, or by both acting together.

FIG. 16 shows an example method 1600 for managing data storage and provides a summary of certain activities and features described above.

At 1610, multiple physical computing machines 140 operate in a NAS (network attached storage) cluster 130. The physical computing machines 140 are interconnected by a computer network 132 and have access to block storage 170.

At 1620, a NAS server 150 operates from a first physical computing machine (e.g., 140-3) in the NAS cluster 130. The NAS server 150 includes a dedicated FSDB (file system database) 152 that identifies a set of file systems 156 that belong to the NAS server 150. The set of file systems 156 is backed by a set of LUNs (Logical UNits) 180 hosted by the block storage 170.

At 1630, in response to a second physical computing machine (e.g., 140-2) in the NAS cluster receiving a request to take over operation of the NAS server 150, the second physical computing machine 140-2 accesses the FSDB 152 of the NAS server 150 to identify each of the set of file systems 156 and the second physical computing machine 140-2 provides host access to each of the set of file systems 156 identified in the FSDB 152. Such host access may include, for example, allowing hosts 110 to mount any of the set of file system 156 and to issue I/O requests 112 to such file systems for effecting reads and writes.

An improved technique has been described for managing data storage, which provides multiple physical computing machines 140 and block storage 170 arranged in a NAS cluster 130. The physical computing machines 140 run NAS servers 150, with each NAS server 150 including an FSDB 152 that identifies a set of file systems 156 that belong to the NAS server 150. The FSDB 152 provides a local repository of information about contents of the NAS server 150, which enables the NAS server 150 to carry information about its own contents with it as it moves from one physical computing machine 140 to another. The file systems identified by the FSDB 152 may include both production file systems and snapshots, such that snapshots as well as production objects follow a NAS server as it moves from one physical computing machine to another. The particular distribution of information within the NAS cluster 130 reduces reliance on centralized data and enables the NAS cluster 130 to scale to very large sizes while avoiding performance bottlenecks.

Section II: NAS Server Cloning in NAS Cluster

This section describes an improved technique for operating a file system in a NAS (network attached storage) cluster, in particular a NAS server cloning operation by which a clone NAS server is created as a clone of the source NAS server. This technique can be used in support of a variety of use cases including backup, disaster recovery, and others as described below.

Embodiments described in this section may be realized in the environment and in the example NAS cluster as presented in Section I. However, embodiments presented in this section are not limited to the environment of Section I or to the NAS cluster as described. Rather, embodiments presented in this section may be used in other environments, in other NAS clusters, and in computerized technology that does not require a NAS cluster. Further, as used herein, the term "NAS cluster" describes an electronic system that includes multiple data nodes having access to shared block storage and configured to service file-based requests for data over a network. A "data node" herein is a node that processes I/O requests from host devices for effecting reads and/or writes of data persisted in the shared block storage. Data nodes may be realized on physical computing machines or in virtual machines or containers that run on physical computing machines.

Figure 17:
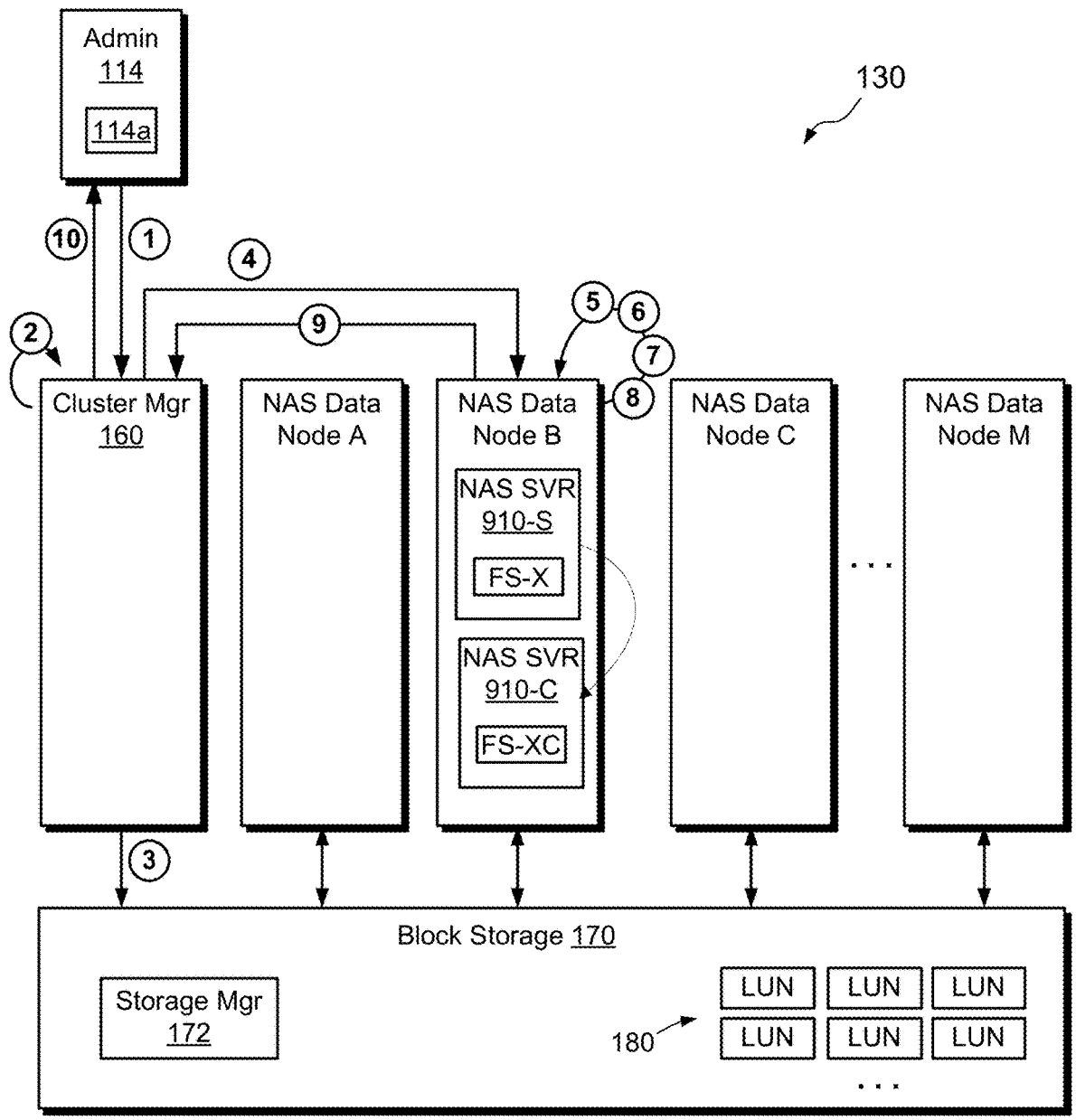
FIG. 17 shows an example sequence for cloning a NAS server in the NAS cluster of FIG. 1.

FIG. 17 shows an example sequence for cloning a NAS server in the NAS cluster 130. The encircled numerals in FIG. 17 depict the following example sequence of operations:

1. Receive, by cluster manager 160, a request from administrative program 114a to clone a NAS Server on NAS data node B, referred to as the "source" NAS Server 910-S. The instruction may be issued by an administrator or other user, and it includes a name of the source NAS server 910-S.
2. Allocate, by cluster manager 160, a new UUID for a clone NAS server 910-C being created by the cloning operation.
3. Cluster manager 160 calls into storage manager 172 to clone the respective LUNs supporting the RootFS, ConfigFS and User File Systems of the source NAS Server 910-S, and receives in response new device IDs for the cloned LUNs.
4. Cluster manager 160 calls into NAS data node B and provides the name and UUID for the clone NAS server 910-C, and the device IDs for the cloned LUNs that will support the RootFS, ConfigFS and User File Systems of the clone NAS Server 910-C.
5. NAS data node B mounts the RootFS as / and the ConfigFS as /ConfigFS.
6. NAS data node B updates the FS DB on RootFS with the new device IDs.
7. NAS data node B updates the following:
   a. ConfigFS: Config File w/ new IP addresses/Server Names
   b. RootFS: FS DB w/ new internal and export file system IDs
8. NAS data node B records the clone NAS Server 910-C on RootFS: Name, UUID, Linux Dev-IDs for RootFS and ConfigFS
   a. Redundant info used for rebuilding System Cluster NAS database
   b. RootFS→Device ID of ConfigFS
      →FS DB→List of device IDs supporting User File Systems in NAS Server
9. Cluster manager 160 records clone NAS Server 910-C in the management database 162: Node #, Name, UUID, Linux device IDs/LUNs for RootFS and Config FS
10. Cluster manager 160 acknowledges request received in step 1.

Here, as well, the actions performed are mostly kept within the NAS data node B, with limited interactions with block storage 170.

Figure 18:
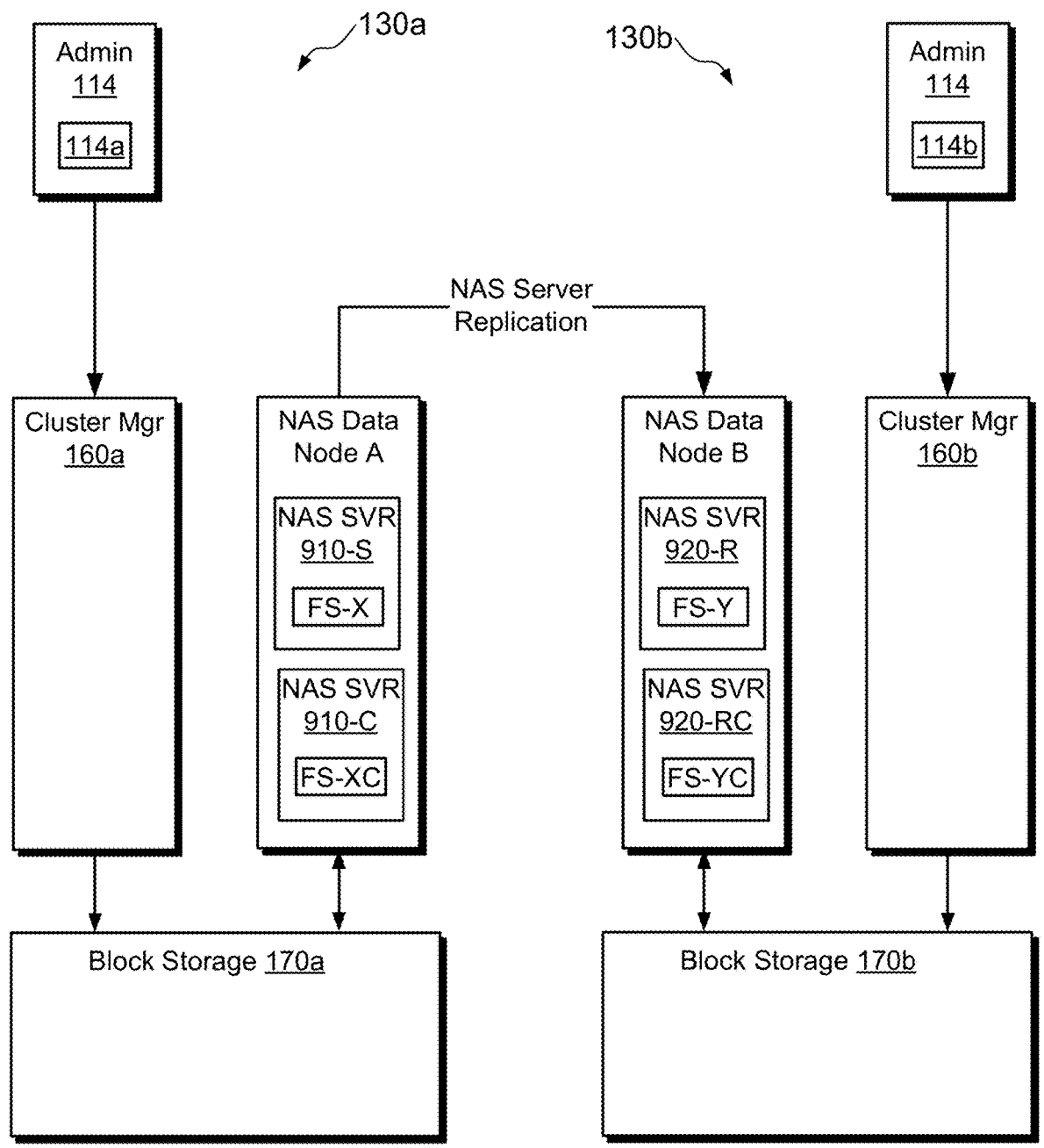
FIG. 18 is a block diagram showing an example arrangement employing cloning with concurrent use of replication.

FIG. 18 illustrates NAS Server cloning in a context of a concurrent NAS Server replication session. Replication may be established and operated generally as described above with reference to FIG. 15. The replication session includes a source NAS server 910-S and replica NAS server 910-R, and the cloning operation creates respective clone NAS servers 910-C and 910-RC.

The operation of FIG. 18 exhibits the following:
I. NAS Server Clones can be taken on Source and Destination Systems (data nodes A and B)
II. NAS Server Clone is Crash Consistent
III. NAS Server Clone obtains:
   Its storage from Cloning Devs/LUNs of the Source NAS Server
   New UUIDs for each File System
   Its own Network Interfaces and IP addresses
   Its own SMB and Secure NFS server names
IV. NAS Server Clone enables the following operations
   Consistency check of the NAS Server
   Backup of the File Systems
   Disaster Recovery testing
   Deployment from NAS Server template FIG. 19 illustrates the cloning/replication scenario in greater detail. In this description, the production NAS server (or Source) is NAS server (1), and the replication NAS server (Destination) is NAS server (2). As shown, each has a respective clone (11) and (21), which may be created as described above.

Generally, NAS server cloning can support a variety of use cases, in either a non-replication environment (FIG. 17) or in conjunction with replication (FIG. 18). FIG. 19 illustrates certain examples for both configurations, including Consistency Check (FSCK) and Backup of the File Systems. Cloning can be used for Deploying a new NAS Server from a NAS Server Template. In the replication setting, cloning can be used to test Disaster Recovery (DR). Once a clone NAS server (21) is created at the replication site, it can be used in a DR restart of a test copy of the application(s) it supports, providing for realistic testing independent of the production NAS servers (1) and (2) that continue to operate with the production instance of the application(s).

Figure 20:
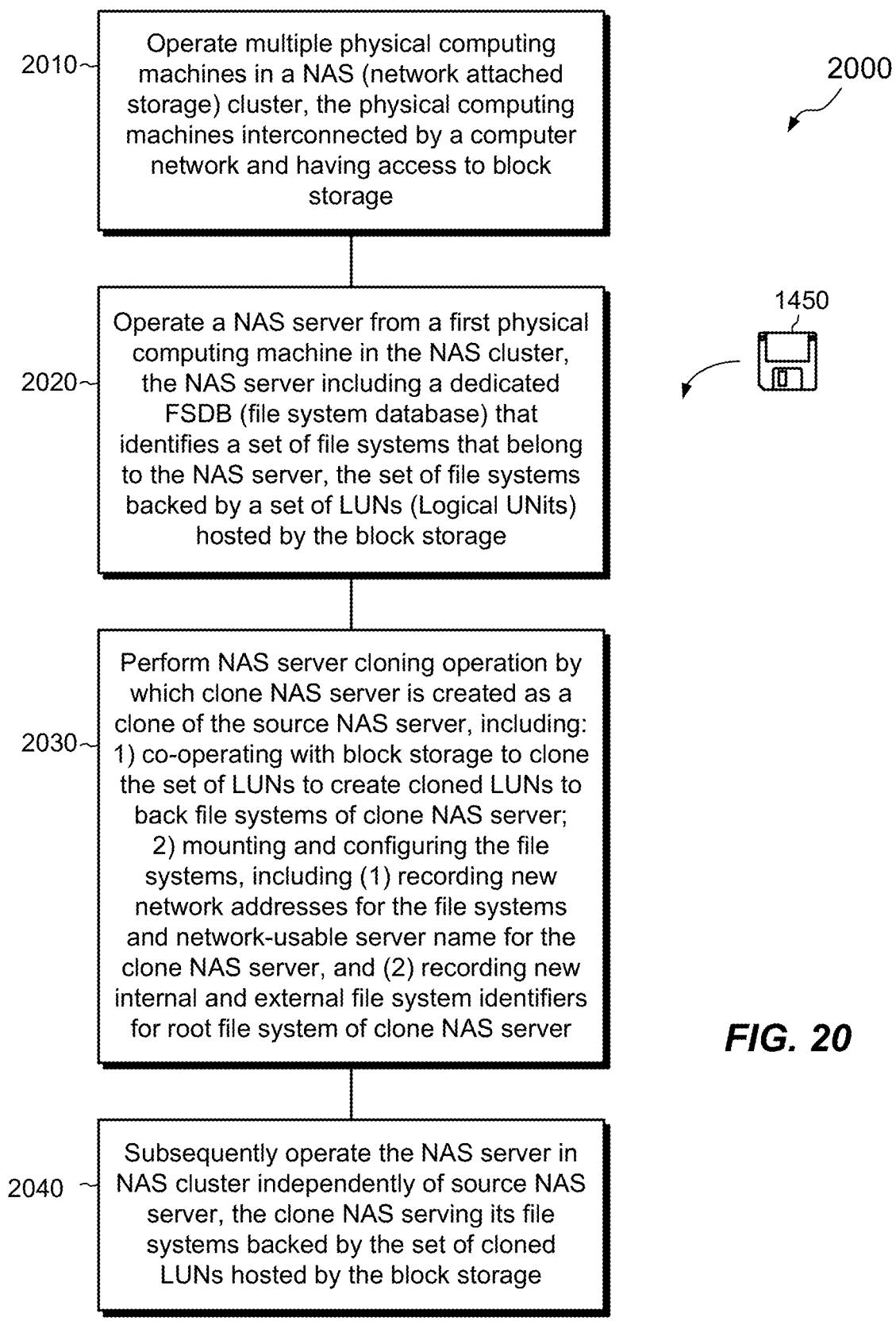
FIG. 20 is an example sequence for cloning a NAS server.

FIG. 20 shows an example method 2000 that may be carried out in connection with the environment 100. The method 2000 is typically performed, for example, by the software constructs described in connection with FIGS. 1-3, which reside in the memory 220 and 320 of the respective physical computing machines 140a and 140b and are run by the respective sets of processing units 212 and 312. The various acts of method 2000 may be ordered in any suitable way. Accordingly, embodiments may be constructed in which acts are performed in orders different from those illustrated, which may include performing some acts simultaneously.

At 2010, multiple physical computing machines are operated in a NAS (network attached storage) cluster, the physical computing machines interconnected by a computer network and having access to block storage.

At 2020, a source NAS server is operated from a physical computing machine in the NAS cluster, the source NAS server including a dedicated FSDB (file system database) that identifies a set of file systems that belong to the source NAS server, the set of file systems backed by a set of LUNs (Logical UNits) hosted by the block storage.

At 2030, a NAS server cloning operation is performed by which a clone NAS server is created as a clone of the source NAS server. The cloning operation includes:

1) co-operating with the block storage to clone the set of LUNs to create a set of cloned LUNs to back file systems of the clone NAS server; and 2) mounting and configuring the file systems of the cloned LUNs, the configuring including (1) recording new network addresses for the file systems and network-usable server name for the clone NAS server, and (2) recording new internal and external file system identifiers for a root file system of the clone NAS server.

At 2040, the clone NAS server is subsequently operated in the NAS cluster independently of the source NAS server, the clone NAS serving its file systems backed by the set of cloned LUNs hosted by the block storage.

Regarding the space efficiency of cloning a NAS server, efficiency may be determined in part by the underlying block storage implementation of the clone operation. Also, with respect to cloning in the context of replication, cloning the NAS server on a replication destination may co-ordinate with the replication service for data consistency and identifying the most up-to-date data to be cloned.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment may be included with any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1450 in FIGS. 14-16). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing data storage, the method comprising:

operating multiple physical computing machines in a NAS (network attached storage) cluster, the physical computing machines interconnected by a computer network and having access to block storage;

operating a source NAS server from a physical computing machine in the NAS cluster, the source NAS server including a dedicated FSDB (file system database) that identifies a set of file systems that belong to the source NAS server, the set of file systems backed by a set of LUNs (Logical UNits) hosted by the block storage;

performing a NAS server cloning operation by which a clone NAS server is created as a clone of the source NAS server, including:

co-operating with the block storage to clone the set of LUNs to create a set of cloned LUNs to back file systems of the clone NAS server;

mounting and configuring the file systems of the cloned LUNs, the configuring including (1) recording new network addresses for the file systems and network-usable server name for the clone NAS server, and (2) recording new internal and external file system identifiers for a root file system of the clone NAS server; and subsequently operating the clone NAS server in the NAS cluster independently of the source NAS server, the clone NAS serving its file systems backed by the set of cloned LUNs hosted by the block storage.

2. The method of claim 1, further comprising:

storing the FSDB of the clone NAS server within an internal file system of the clone NAS server, the internal file system backed by a particular LUN in the block storage; and as part of the NAS server cloning operation, (i) mounting the internal file system of the clone NAS server, and (ii) accessing the FSDB from within the internal file system.

3. The method of claim 2, wherein the set of file systems identified by the FSDB of the clone NAS server includes a production file system and a set of snapshots of the production file system, each snapshot of the production file system providing a respective point-in-time version of the production file system, and wherein operating the clone NAS server includes providing host access to the production file system as well as to the set of snapshots of the production file system.

4. The method of claim 3, wherein the FSDB stores information about each of the set of file systems, the information including:
   a name of the file system;
   an FSID (file system identifier) of the file system; and
   a designation indicating whether the file system is a snapshot.

5. The method of claim 4, wherein a set of the physical computing machines in the NAS cluster each runs a respective NAS data node manager, each NAS data node manager constructed and arranged to operate multiple NAS servers, each NAS server having its own dedicated FSDB that identifies its own respective set of file systems.

6. The method of claim 5, further comprising:
   operating a cluster manager within the NAS cluster, the cluster manager having a management database that stores, for each NAS server in the NAS cluster, (i) an identifier of a NAS data node that operates the respective NAS server, (ii) an identifier of a LUN in block storage that backs the FSDB of the respective NAS server, and (iii) an identifier of a LUN in block storage that backs each of the set of file systems identified by the FSDB of the respective NAS server.

7. The method of claim 6, wherein the NAS data node manager running on each of the set of physical computing machines is implemented as a userspace process running over a kernel in the respective physical computing machine, each NAS data node manager as a userspace process providing an execution environment for processing host I/O requests directed to file systems within NAS servers operated by the respective NAS data node.

8. The method of claim 7, wherein operating the source NAS server includes:
   the first physical computing machine running a NAS data node manager as a userspace process over a kernel;
   the kernel discovering a first device based on a LUN in block storage that backs the production file system of the source NAS server;
   the kernel expressing the first device as a first kernel-resident block device accessible from userspace, the first kernel-resident block device having a unique device ID (identifier) within the NAS cluster;
   the NAS data node manager creating a first userspace NAS volume built upon the first kernel-resident block device; and
   the NAS data node manager constructing the production file system upon the first userspace NAS volume.

9. The method of claim 8, wherein operating the clone NAS server includes:
   the kernel discovering a second device based on the LUN in block storage that backs the production file system of the clone NAS server;
   the second kernel expressing the second device as a second kernel-resident block device accessible from userspace, the second kernel-resident block device having a unique device ID different from a device ID of the first kernel-resident block device;
   the NAS data node manager creating a second userspace NAS volume built upon the second kernel-resident block device; and
   the NAS data node manager constructing the production file system of the clone NAS server upon the second userspace NAS volume.

10. The method of claim 8, wherein the NAS data node manager runs within a virtual machine on the physical computing machine.

11. The method of claim 8, wherein the NAS data node manager runs within a container on the physical computing machine, the container providing a virtualized userspace execution environment build on the kernel, the kernel not running within the container.

12. The method of claim 6, wherein the block storage includes multiple storage devices local to the respective physical computing machines and virtualized to form a storage cluster accessible to each of the physical computing machines.

13. The method of claim 6, wherein the block storage includes cloud-based storage.

14. The method of claim 6, wherein the NAS server cloning operation further includes:
   receiving a name and identifier for the clone NAS server, and device identifiers for devices supporting a RootFS, ConfigFS and User File Systems of the NAS server being cloned;
   the NAS data node mounting the RootFS as / and the ConfigFS as /ConfigFS;
   the NAS data node updating the filesystem database on RootFS with the new device identifiers;
   the NAS data node updating the following databases:
   ConfigFS: Config File w/ new IP addresses/Server Names, RootFS: FS DB w/ new internal and export file system IDs; and
   the NAS data node recording the clone NAS server on RootFS, including the name, NAS server identifier, and device identifiers for RootFS and ConfigFS.

15. The method of claim 14, further including:
   the cluster manager recording the clone NAS server in the management database, including a node identifier of the NAS data node, the server name and identifier, and the device identifiers of the LUNs for the RootFS and Config FS.

16. The method of claim 1, wherein the clone NAS server is created at a replication site, and further including, as part of a disaster recovery testing procedure, performing a disaster recovery restart of a test instance of an application that accesses the file systems of the clone NAS server, providing for realistic testing independent of source and replication NAS servers that continue to co-operate with a separate production instance of the application.

17. A NAS (network attached storage) cluster, comprising:
   multiple physical computing machines interconnected via a computer network and having access to block storage, the physical computing machines including control circuitry constructed and arranged to:
   operating the physical computing machines in a NAS (network attached storage) cluster;
   operate a source NAS server from a physical computing machine in the NAS cluster, the source NAS server including a dedicated FSDB (file system database) that identifies a set of file systems that belong to the source NAS server, the set of file systems backed by a set of LUNs (Logical UNits) hosted by the block storage;
   perform a NAS server cloning operation by which a clone NAS server is created as a clone of the source NAS server, including:
      co-operating with the block storage to clone the set of LUNs to create a set of cloned LUNs to back file systems of the clone NAS server;

mounting and configuring the file systems of the cloned LUNs, the configuring including (1) recording new network addresses for the file systems and network-usable server name for the clone NAS server, and (2) recording new internal and external file system identifiers for a root file system of the clone NAS server; and subsequently operate the clone NAS server in the NAS cluster independently of the source NAS server, the clone NAS serving its file systems backed by the set of cloned LUNs hosted by the block storage.

18. A computer program product including a set of non-transitory, computer-readable media having instructions which, when executed by control circuitry of a NAS (network attached storage) cluster, cause the control circuitry to perform a method for managing data storage, the method comprising:

operating multiple physical computing machines in the NAS cluster, the physical computing machines interconnected by a computer network and having access to block storage;

operating a source NAS server from a physical computing machine in the NAS cluster, the source NAS server including a dedicated FSDB (file system database) that identifies a set of file systems that belong to the source NAS server, the set of file systems backed by a set of LUNs (Logical UNits) hosted by the block storage;

performing a NAS server cloning operation by which a clone NAS server is created as a clone of the source NAS server, including:

co-operating with the block storage to clone the set of LUNs to create a set of cloned LUNs to back file systems of the clone NAS server;

mounting and configuring the file systems of the cloned LUNs, the configuring including (1) recording new network addresses for the file systems and network-usable server name for the clone NAS server, and (2) recording new internal and external file system identifiers for a root file system of the clone NAS server; and subsequently operating the clone NAS server in the NAS cluster independently of the source NAS server, the clone NAS serving its file systems backed by the set of cloned LUNs hosted by the block storage.

* * * * *